US010003387B2

(12) United States Patent
Clevorn et al.

(10) Patent No.: US 10,003,387 B2
(45) Date of Patent: Jun. 19, 2018

(54) COMMUNICATIONS TERMINAL, A NETWORK COMPONENT, A METHOD FOR TRANSMITTING A SIGNAL, AND A METHOD FOR PROVIDING FEEDBACK INFORMATION TO A COMMUNICATIONS TERMINAL

(71) Applicant: Intel Mobile Communications GmbH, Neubiberg (DE)

(72) Inventors: Thorsten Clevorn, Munich (DE); Herbert Dawid, Herzogenrath (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 0 days. days.

(21) Appl. No.: 13/834,421

(22) Filed: Mar. 15, 2013

(65) Prior Publication Data
US 2014/0273874 A1 Sep. 18, 2014

(51) Int. Cl.
*H04B 7/04* (2017.01)
*H04B 7/0417* (2017.01)
*H04B 7/06* (2006.01)
*H04W 24/02* (2009.01)
*H04B 7/0404* (2017.01)

(52) U.S. Cl.
CPC ......... *H04B 7/0417* (2013.01); *H04B 7/0404* (2013.01); *H04B 7/0621* (2013.01); *H04B 7/0671* (2013.01); *H04B 7/0673* (2013.01); *H04W 24/02* (2013.01)

(58) Field of Classification Search
CPC combination set(s) only.
See application file for complete search history.

(56) References Cited

U.S. PATENT DOCUMENTS

| 6,141,542 | A | * | 10/2000 | Kotzin | H04B 7/061 370/331 |
| 7,505,741 | B2 | * | 3/2009 | Li | H04B 1/7115 370/328 |
| 2003/0181165 | A1 | * | 9/2003 | Sugar | H04B 7/0615 455/69 |
| 2008/0188229 | A1 | * | 8/2008 | Melis et al. | 455/450 |
| 2009/0080543 | A1 | | 3/2009 | Azizi et al. | |

(Continued)

FOREIGN PATENT DOCUMENTS

EP 1469686 A1 10/2004
EP 2208292 B1 7/2013

OTHER PUBLICATIONS

3GPP TS 25.101 V11.5.0, 3rd Generation Partnership Project; Technical Specification Group Radio Access Network; User Equipment (UE) radio transmission and reception (FDD) (Release 11), Mar. 2013, "Annex B B.2.2 Multi-path fading propagation conditions" pp. 293-296.

(Continued)

*Primary Examiner* — Junpeng Chen
(74) *Attorney, Agent, or Firm* — Viering Jentschura & Partner mbB

(57) ABSTRACT

A communications terminal may include: a plurality of antennas; and a transmitter configured to transmit a signal on an antenna of the plurality of antennas, wherein the transmitter further may be configured to transmit a delayed signal on another antenna of the plurality of antennas, and wherein the delayed signal may be generated by delaying the signal by a time delay.

34 Claims, 12 Drawing Sheets

(56) References Cited

U.S. PATENT DOCUMENTS

| | | |
|---|---|---|
| 2009/0149139 A1* | 6/2009 | Harel .................. H04B 7/0619 |
| | | 455/101 |
| 2010/0054191 A1 | 3/2010 | Higuchi et al. |
| 2011/0021225 A1 | 1/2011 | Cosimini et al. |
| 2011/0116407 A1* | 5/2011 | Ren ..................... H04B 7/2681 |
| | | 370/252 |
| 2012/0002661 A1 | 1/2012 | Nishimoto et al. |
| 2012/0099513 A1* | 4/2012 | Suh et al. .................... 370/312 |
| 2012/0281551 A1* | 11/2012 | Alanara ............. H04L 27/2607 |
| | | 370/252 |
| 2013/0128929 A1 | 5/2013 | Clevorn et al. |
| 2014/0226586 A1* | 8/2014 | Kimura ............ H03M 13/2957 |
| | | 370/329 |

OTHER PUBLICATIONS

Wan Choi et al., A New Base Station Receiver for Increasing Diversity Order in a CDMA Cellular System, IEEE Transactions on Communications, Nov. 2004, pp. 1851-1856, vol. 52, No. 11.

M. Bossert et al., On Cyclic Delay Diversity in OFDM Based Transmission Schemes, 7th International OFDM Workshop (InOWo), 2002, 5 pages, Hamburg Germany.

Toda et al., "Field Trial of Space-Time Equalizer and Delay Diversity Transmission in Uplink for TDMA Mobile Communication", IEEE Transactions on Wireless Communications, Jul. 2005, pp. 1585-1593, vol. 4.

Office Action for corresponding DE Application No. 10 2014 103 204.7 dated Aug. 11, 2016, 8 pages—for information purposes only.

* cited by examiner

US 10,003,387 B2

COMMUNICATIONS TERMINAL, A NETWORK COMPONENT, A METHOD FOR TRANSMITTING A SIGNAL, AND A METHOD FOR PROVIDING FEEDBACK INFORMATION TO A COMMUNICATIONS TERMINAL

TECHNICAL FIELD

Various aspects relate to a communications terminal, a network component, a method for transmitting a signal, and a method for providing feedback information to a communications terminal.

BACKGROUND

Modulation and demodulation of signals transmitted and/or received in a radio communications network may affect the use of network resources (e.g. time slot, frequency bandwidth, channel access code, etc.) of a radio communications network and devices used therein. For example, the use of network resources (e.g. time slot, frequency bandwidth, channel access code, etc.) may be optimized based on a modulation and/or demodulation scheme.

Devices operating in, for example, a 3G ($3^{rd}$ Generation) radio communications network, may be equipped with two or more antennas. It may be desirable to further optimize the use of network resources (e.g. time slot, frequency bandwidth, channel) based on the two or more antennas included in the devices (e.g. terminals and/or base stations).

SUMMARY

A communications terminal is provided, which may include: a plurality of antennas; and a transmitter configured to transmit a signal on an antenna of the plurality of antennas, wherein the transmitter further may be configured to transmit a delayed signal on another antenna of the plurality of antennas, and wherein the delayed signal may be generated by delaying the signal by a time delay.

A network component is provided, which may include: at least one antenna; a receiver configured to receive at least one uplink signal on the at least one antenna; and a determining circuit configured to determine feedback information based on the at least one uplink signal, the feedback information for determining a time delay between a transmission of a first signal on an antenna and a transmission of a second signal on another antenna.

A method for transmitting a signal is provided, which may include: generating a delayed signal by delaying the signal by a time delay; transmitting the signal on an antenna of a plurality of antennas; and transmitting the delayed signal on another antenna of the plurality of antennas.

A method for providing feedback information to a communications terminal is provided, which may include: receiving at least one uplink signal; determining the feedback information based on the at least one uplink signal; and transmitting the feedback information to the communications terminal, the feedback information for determining a time delay between a transmission of a first signal on an antenna and a transmission of a second signal on another antenna.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DESCRIPTION

The following detailed description refers to the accompanying drawings that show, by way of illustration, specific details and aspects in which the invention may be practised. These aspects are described in sufficient detail to enable those skilled in the art to practice the invention. Other aspects may be utilized and structural, logical, and electrical changes may be made without departing from the scope of the invention. The various aspects are not necessarily mutually exclusive, as some aspects can be combined with one or more other aspects to form new aspects. Various aspects are described for structures or devices, and various aspects are described for methods. It may be understood that one or more (e.g. all) aspects described in connection with structures or devices may be equally applicable to the methods, and vice versa.

The word "exemplary" is used herein to mean "serving as an example, instance, or illustration". Any aspect or design described herein as "exemplary" is not necessarily to be construed as preferred or advantageous over other aspects or designs.

The term "radio communications network" is used herein to refer to a radio communications system configured in accordance with the network architecture of any one of, or any combination of, LTE (Long Term Evolution) cellular communications technology, UMTS (Universal Mobile Telecommunications System) cellular communications technology which may include the system enhancement HSPA (High Speed Packet Access), GSM (Global System for Mobile Communications) cellular communications technology which may include system enhancements General Packet Radio System (GPRS) and Enhanced Data rates for GSM Evolution (EDGE) and CDMA2000 (Code Division Multiple Access) cellular communications technology, although other radio communications technology may be possible as well.

The terms "radio communications network", "network", "radio network", "cellular network", "radio network communications system", "cellular network communications system", "cellular radio communications technology", "cellular communications system" and "radio communications system" may refer to the same logical entity and may be used interchangeably throughout the entire description.

Figure 1:
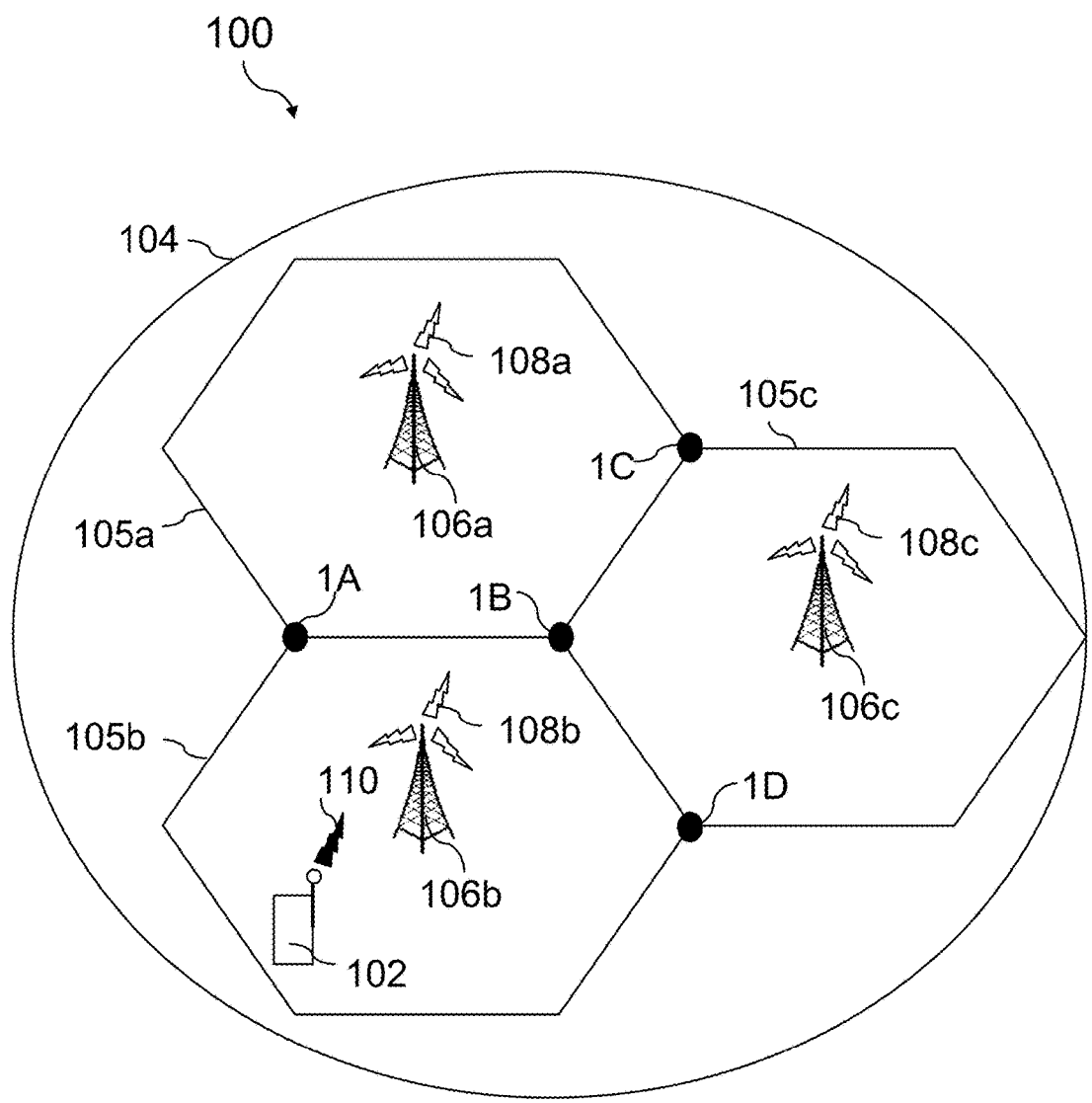
FIG. 1 shows a communications system.

FIG. 1 shows a communications system 100.

The communications system 100 may include a communications terminal 102 (which may also be referred to as a terminal 102) and at least one network component 106a, 106b, 106c, which may be part of a radio communications network 104. In other words, the at least one network component 106a, 106b, 106c may be a component of the radio communications network 104.

Only one terminal 102 is shown is shown as an example, however the number of terminals may be greater than one, and may, for example, be two, three, four, five, six, seven, eight, nine, or on the order of tens, hundreds of, or even more terminals. In like manner, only three network components 106a, 106b, 106c are shown as an example, however the number of network components may be one, two and may be more, for example, four, five, six, seven, eight, nine, or on the order of tens, hundreds of, or even more network components.

The communications system 100 and/or the radio communications network 104 may be configured in accordance with the network architecture of any one of, or any combination of, LTE (Long Term Evolution) cellular communications technology, UMTS (Universal Mobile Telecommunications System) cellular communications technology, GSM (Global System for Mobile Communications) cellular communications technology, and CDMA2000 (Code Division Multiple Access) cellular communications technology, although other cellular communications technology may be possible as well.

The terminal 102 may include, or may be, a UE (user equipment) equipped with a SIM (Subscriber Identity Module) running on a UICC (Universal Integrated Circuit Card), a computer (e.g. a laptop equipped with, for example, a wireless radio connection, such as, for example, a 3G ($3^{rd}$ generation) radio connection, a 4G ($4^{th}$ generation) radio connection), or any other equipment that may be configured to connect to a radio communications network.

The terminal 102 (e.g. a UE) may be within the area of coverage of the radio communications network 104, such as, for example, a PLMN (Public Land Mobile Network). The area of coverage of the radio communications network 104 may be the aggregate result of the coverage of the at least one network component 106a, 106b, 106c of the radio communications network 104. In other words, each network component of the at least one network component 106a, 106b, 106c of the radio communications network 104 may have a respective area of coverage, and an aggregation of the respective areas of coverage may determine the area of coverage of the radio communications network 104. By way of an example, the area of coverage (which may also be referred to as "the region of coverage") of the radio communications network 104 shown in FIG. 1 may at least be the aggregate result of the coverage of the network components 106a, 106b, and 106c, and other network components belonging to the radio communications network 104 (other network components (e.g. base stations) are not shown in FIG. 1).

At least one of the network components 106a, 106b, 106c may include, or may be, a base station, a NB (Node B), an eNB (Evolved Node B), a Home NB, a traditional NB, and a wireless router, although other network components may be possible as well.

In FIG. 1, the terminal 102 may be configured to transmit an uplink (UL) signal 110 at a particular power. An uplink (UL) may refer to a connection from the terminal 102 towards at least one network component (e.g. the network component 106b) of the radio communications network 104. Accordingly, the UL signal 110 may include, or may be, a signal transmitted from the terminal 102 (e.g. a UE) to at least one network component (e.g. the network component 106b, for example a base station) of the radio communications network 104.

In FIG. 1, the at least one network component 106a, 106b, and 106c (e.g. base station) may be configured to transmit a downlink (DL) signal at a particular power. A downlink (DL) may refer to a connection from at least one of the network components 106a, 106b, 106c of the radio communications network 104 towards the terminal 102. Accordingly, a DL signal may include, or may be, a signal transmitted from the at least one network component 106a, 106b, 106c (e.g. base station) to the terminal 102 (e.g. a UE). By way of an example, the network component 106a may be configured to transmit a DL signal 108a; the network component 106b may be configured to transmit a DL signal 108b; and the network component 106c may be configured to transmit a DL signal 108c. The DL signals 108a, 108b, 108c transmitted by the at least one network component 106a, 106b, and 106c may, for example, cover a particular geographical area.

The geographical area covered by a network component (i.e. the region of coverage of a network component) of the at least one network component 106a, 106b, or 106c may be substantially (namely, approximately) represented by a cell (which may also be referred to as a "radio cell"). By way of an example, the region of coverage of the network component 106a may be substantially represented by a cell 105a; the region of coverage of the network component 106b may be substantially represented by a cell 105b; and the region of coverage of the network component 106c may be substantially represented by a cell 105c. Accordingly, the region of coverage of the radio communications network 104 may be represented by at least one cell, or by a tessellation of two or more cells, where each cell may be an approximation of the area of coverage of a network component (e.g. base station) of the radio communications network 104. By way of an example, area of coverage of the radio communications network 104 may represented by the tessellation of cells 105a, 105b, and 105c.

Whilst a respective cell 105a, 105b, 105c may be an approximation of the area of coverage of a respective network component 106a, 106b, 106c, there may be geographical regions that may be served by more than one network component. By way of an example, the geographical region on either side of a boundary formed by a line joining points 1A and 1B shown in FIG. 1 may be served by the network component 106a or the network component 106b, or both; the geographical region on either side of a boundary formed by a line joining points 1B and 1C may be served by the network component 106a or the network component 106c, or both; and the geographical region on either side of a boundary formed by a line joining points 1B and 1D may be served by the network component 106b or the network component 106c, or both.

When the terminal 102 is initially switched off, there may be no connection between the terminal 102 and the radio communications network 104. For example, there may not exist a connection between the terminal 102 and the network component 106b (or any of the other network components 106a, 106c) shown in FIG. 1 when the terminal 102 is powered down. Accordingly, a terminal 102 that is switched off may not have connectivity to a communications service and/or network resource (e.g. time slot, frequency bandwidth, channel access code, etc.) delivered by the radio communications network 104 and/or the network component 106b.

However, when the terminal 102 is turned on within and/or near the area of coverage of the radio communications network 104, the terminal 102 may search for and/or identify and/or select a network component of the at least one network component 106a, 106b, 106c of the radio communications network 104. By searching for and/or identifying and/or selecting a network component (e.g. a base station), the terminal 102 may establish a communications connection with the radio communications network 104 in order to, for example, use a communications service and/or network resource (e.g. time slot, frequency bandwidth, channel access code, etc.) delivered by the radio communications network 104 and/or at least one of the network components 106a, 106b, 106c.

A communications connection with the radio communications network 104 may be established by means of, for example, establishing at least one communications channel between the terminal 102 and at least one of the network components 106a, 106b, 106c. The at least one communications channel established between the terminal 102 and at least one of the network components 106a, 106b, 106c may include at least one UL channel (e.g. a channel from the terminal 102 to at least one of the network components 106a, 106b, 106c) and/or at least one DL channel (e.g. a channel from at least one of the network components 106a, 106b, 106c to the terminal 102).

The number of communications channels established between the terminal 102 and the network components 106a, 106b, 106c may, for example, depend on the radio communications network 104. In a radio communications network 104 which may, for example, be a hard handoff system, there may be one communications channel established between the terminal 102 and one of the network components (e.g. the network component 106b). If, for example, the terminal 102 is mobile (i.e. moving), the link to, for example, the network component 106b established through the communications channel may be terminated before, or as, the terminal 102 is transferred to a new network component (e.g. the network component 106a). In other words, the terminal 102 may be linked to no more than one network component at a given time. In a radio communications network 104 which may, for example, be a soft handoff/handover (SHO) system (e.g. in a CDMA and/or UMTS system), the terminal 102 may be connected to two or more network components at a time (e.g. the network components 106a and 106b). The network component with, for example, the highest relative strength seen from the terminal 102 may be given control of the terminal 102.

As described above, an UL signal 110 may be transmitted from the terminal 102 to at least one of the network components 106a, 106b, 106c, and a DL signal (e.g. DL signals 108a, 108b, 108c) may be transmitted from at least one of the network components 106a, 106b, 106c to the terminal 102. The UL signal 110 and/or the DL signals 108a, 108b, 108c may, for example, include an information-bearing signal transmitted on a carrier wave. Accordingly, the terminal 102 may be required to demodulate the DL signal, i.e. extract the original information-bearing signal from the DL signal. In like manner, the network components 106a, 106b, 106c may be required to demodulate the UL signal, i.e. extract the original information-bearing signal from the UL signal.

A demodulation performance (e.g. as measured by an error rate, for example a bit error rate, a block error rate, etc.) of the at least one network component 106a, 106b, 106c and/or the terminal 102 may affect the efficient use of network resources (e.g. time slot, frequency bandwidth, channel access code, etc.) of a radio communications network 104 and devices used therein (e.g. the terminal 102 and/or the network components 106a, 106b, 106c).

The demodulation performance of the at least one network component 106a, 106b, 106c and/or the terminal 102 may be improved by providing multiple (i.e. two or more) antennas on the terminal 102 and/or the at least one network component 106a, 106b, 106c.

In current radio communications technologies, a DL signal (e.g. at least one of DL signals 108a, 108b, 108c) may, for example, be transmitted by a network component using two or more antennas. In such an example, the terminal 102 may, for example, receive the DL signal using two or more of its antennas. On the other hand, an UL transmission in current radio communications technologies (e.g. GSM, Wideband CDMA, etc.) from the terminal 102 to at least one of the network components 106a, 106b, 106c may only use one antenna of the plurality of antennas. For example, the terminal 102 may choose the best antenna among the plurality of antennas for transmission of an UL signal 110 (according to some criterion, for example, SNR or power of a DL signal received by the terminal 102). In other words, although the terminal 102 may include a plurality of antennas (e.g. two or more antennas), the plurality of antennas may in many cases (e.g. GSM, Wideband CDMA, etc.) be used for receiving a DL signal 108a, 108b, 108c, and not for transmitting an UL signal 110.

Current radio communications technologies, such as OFDM (Orthogonal Frequency Division Multiplexing) systems, may, for example, use cyclic delays to improve demodulation performance in a radio communications system. However, in such an example, the cyclic delays used are fixed. Accordingly, the terminal 102 and/or the network components 106a, 106b, 106c may not be configured to adapt to changing channel conditions that might arise in the radio communications system.

Current radio communications technologies may use MIMO (multiple-input and multiple-output) to improve demodulation performance. For example, 3GPP ($3^{rd}$ Generation Partnership Project) release 11 for 3G Wideband CDMA specifies the optional use of open and closed loop transmit diversity (CLTD) in an UL transmission from the terminal 102 to at least one of the network components 106a, 106b, 106c and/or in a DL transmission from at least one of the network components 106a, 106b, 106c to the terminal 102.

CLTD, for example, may rely on channel knowledge, be it partial or full, at the terminal 102 and/or a network component of the network components 106a, 106b, 106c. With channel knowledge, a more advanced transmission scheme may be implemented. For example, with full channel state information, beamforming may be possible. However, this may complicate receiver and/or transmitter design at the terminal 102 and/or at the at least one network component 106a, 106b, 106c.

Space Time Transmit Diversity (STTD), for example, may require a signal at the terminal 102 and/or the network component which is to be transmitted to be encoded in blocks, which may be distributed among the plurality of antennas over time. The blocks may be encoded over all antennas, and thus, the encoded signal may bear little, if not no, resemblance to the original signal to be transmitted. This may complicate receiver and/or transmitter design at the terminal 102 and/or at the at least one network component

106a, 106b, 106c since a decoder may be required in the demodulation process to extract the original signal from the received signal. In other words, there may be a need for close synchronization between a transmitter and a receiver, and there may also be a need for standardization. Furthermore, in contrast to OFDM systems, STTD may not introduce a delay (e.g. cyclic or otherwise) to the encoded signal and/or the original signal.

Accordingly, there may be a need to provide transmit diversity for transmissions from a terminal to a network component without having to synchronize between the terminal and the network component and/or without having to require standardization and/or without having to complicate receiver and/or transmitter design.

Providing transmit diversity for transmissions from a terminal to a network component may have an effect of increasing the number of transmission paths from the terminal to the network component.

Providing transmit diversity for transmissions from a terminal to a network component may have an effect of providing transmit diversity gain at the receive side in an UL transmission.

Providing transmit diversity for transmissions from a terminal to a network component may have an effect of providing receive diversity and/or receive diversity gain at the network component that may receive a transmission from the terminal using a plurality of antennas at the network component.

Providing transmit diversity for transmissions from a terminal to a network component may have an effect of improving demodulation performance at the network component.

Providing transmit diversity for transmissions from a terminal to a network component may have an effect of optimizing the use of network resources (e.g. time slot, frequency bandwidth, channel access code, etc.) of a radio communications network.

A communications terminal may be provided to increase the number of transmission channels.

Figure 2:
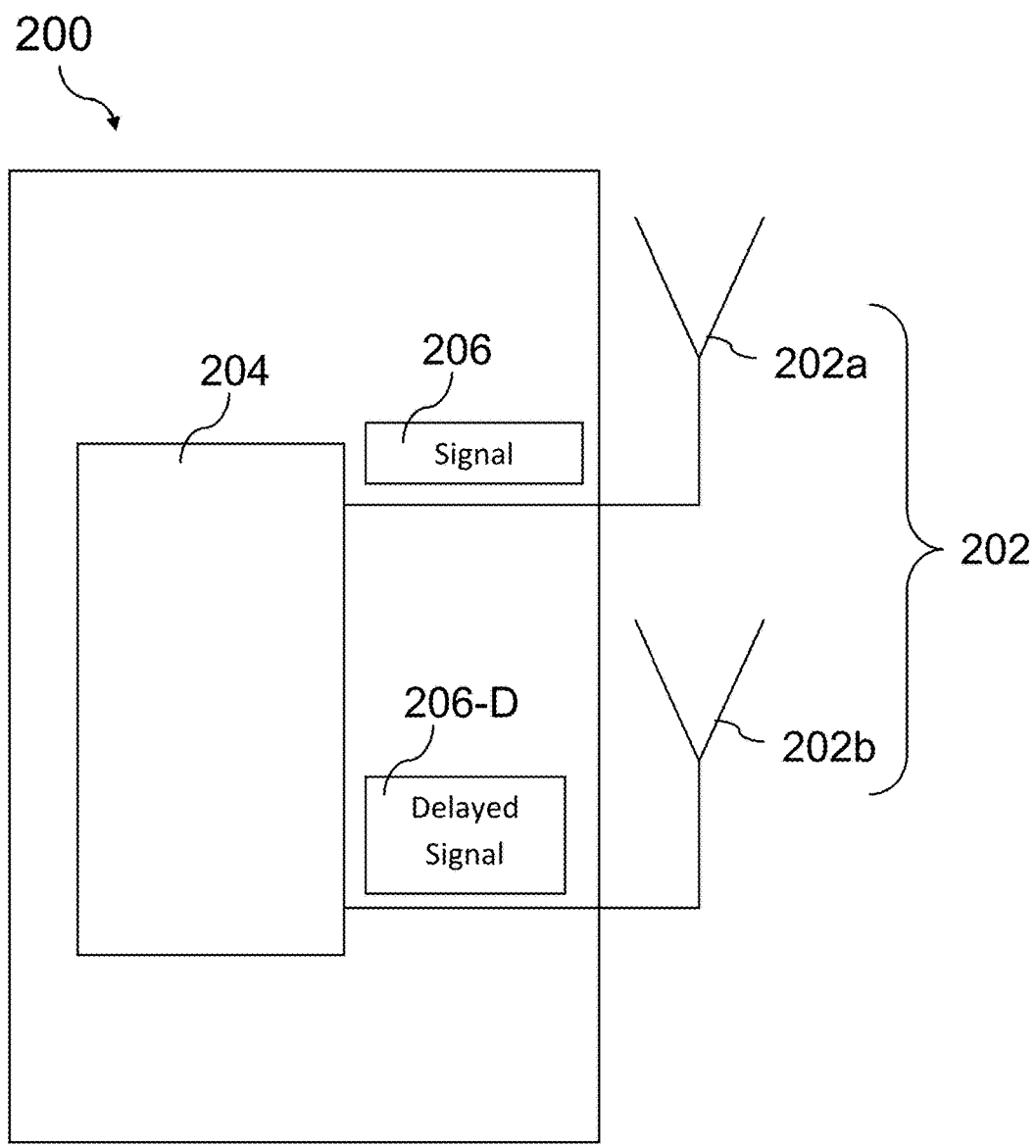
FIG. 2 shows a communications terminal.

FIG. 2 shows a communications terminal 200.

The communications terminal 200 may include a plurality of antennas 202 and a transmitter 204.

Only two antennas 202a, 202b are shown as an example of the plurality of antennas 202, however the number of antennas may be greater than two, and may, for example, be three, four, five, six, seven, eight, nine, or on the order of tens, or even more antennas.

The transmitter 204 of the communications terminal 200 may be configured to transmit a signal 206, which may, for example, be configured according to a 3G communications technology, on an antenna 202a of the plurality of antennas 202. In other words, the signal 206 may, for example, be configured according to Wideband CDMA technology, CDMA2000 technology or UMTS technology, although the signal 205 may be configured in accordance with other 3G communications technologies as well. The signal 205 may not be limited to 3G communications technologies. For example, in addition or alternatively, the signal 206 may, for example, be configured according to communications technologies introduced after 3G communications technology, for example 4G communications technology (e.g. LTE communications technology). In addition or alternatively, the signal 206 may, for example, be configured according to communications technologies introduced before 3G communications technology (e.g. 2G ($2^{nd}$ Generation) communications technology, such as, for example, legacy systems, OFDM (Orthogonal Frequency Division Multiplexing) systems, etc.).

In like manner, the transmitter 204 may be configured in accordance with a 3G communications technology (e.g. Wideband CDMA technology, CDMA2000 technology, etc.), although the transmitter 204 may be configured in accordance with other communications technologies as well, such as, for example, communications technologies introduced before 3G communications technology (e.g. 2G communications technology, such as, for example, legacy systems, OFDM (Orthogonal Frequency Division Multiplexing) systems, etc.), or communications technologies introduced after 3G communications technology, for example 4G communications technology (e.g. LTE communications technology).

The transmitter 204 may be further configured to transmit a delayed signal 206-D on another antenna 202b of the plurality of antennas 202. The delayed signal 206-D may be time-delayed version of the signal 206. In other words, the delayed signal 206-D may be formed by delaying the signal 206 by a time delay TD. Stated in yet another way, the delayed signal 206-D may differ from the signal 206 by a time delay TD, and other aspects of the delayed signal 206-D may, for example, be identical to the signal 206. For example, the delayed signal 206-D and the signal 206 may share an identical MCS (Modulation and Coding Scheme), identical scrambling codes, identical symbols, etc., and may only differ in that the delayed signal 206-D is a time-delayed version of the signal 206. The delayed signal 206-D may have an at least substantially similar signal form as the signal 206. For example, the delayed signal 206-D may substantially be an amplitude scaled version of the signal 206. By way of another example, the delayed signal 206-D may be an amplitude scaled version of the signal 206. In such an example, the delayed signal 206-D and the signal 206 may have the same signal form. By way of yet another example, if the amplitudes of the delayed signal 206-D and the signal 206 are plotted against a time axis, the shapes of the delayed signal 206-D and the signal 206 may be at least substantially similar and may, possibly, be identical (in other words, may have the same signal form). Stated in another way, the delayed signal 206-D may be delayed in time, and may, possibly, be scaled in amplitude relative to the signal 206.

The signal 206 may, for example, be delayed by means of a digital circuit (e.g. by storing In-phase and Q-phase Digital RF (radio frequency) samples in a digital circuit) or by an analog circuit (e.g. a tape delay).

The communications terminal 200 may include, or may be, a UE (user equipment) equipped with a SIM (Subscriber Identity Module) running on a UICC (Universal Integrated Circuit Card), a computer (e.g. a laptop equipped with, for example, a wireless radio connection, such as, for example, CDMA2000 and/or UMTS), or any other equipment that may be configured to connect to a radio communications network.

As described above in relation to FIG. 1, the terminal 102 may be configured to use only one antenna of its two or more antennas in an UL transmission from the terminal 102 to one or more of the network components 106a, 106b, 106c. Accordingly, the terminal 102 may, for example, use only one communications channel during an UL transmission. In other words, only one transmission channel may be foreseen by the terminal 102 in an UL transmission.

In contrast to the terminal 102 shown in FIG. 1, the communications terminal 200 shown in FIG. 2 may, for example, be configured to use at least two antennas of its plurality of antennas 202 in, for example, an UL transmission. For example, antenna 202a (which may transmit signal 206) and antenna 202b (which may transmit delayed signal 206-D) may be used by the communications terminal 200 (e.g. a UE) for an UL transmission to a network component (e.g. one or more of the network components 106a, 106b, 106c shown in FIG. 1).

The total transmission power of the communications terminal 200 may, for example, be kept constant relative to the terminal 102. For example, the total transmission power may be divided among the plurality of antennas 202 used to transmit the signal 206 and time-delayed versions of it. For example, the transmission power at each of the antennas 202a and 202b shown in FIG. 2 may be half the total transmission power, thus keeping the total transmission power equal to that of, for example, terminal 102 shown in FIG. 1. By way of another example, the total transmission power may be fixed, but the distribution of the total transmission power among the plurality of antennas 202 may not be equal. For example, the transmission power at the antenna 202a may be a fraction F of the total transmission power of that of terminal 102 shown in FIG. 1, and the transmission power at the antenna 202b may be a fraction (1-F) of the total transmission power.

An effect provided by the communications terminal 200 may be provision of transmit diversity and/or transmit diversity gain at the communications terminal 200 in an UL transmission.

An effect provided by the communications terminal 200 may be provision of receive diversity and/or receive diversity gain at a network component including a plurality of antennas that may receive a transmission from the plurality of antennas 202 of the communications terminal 200.

An effect provided by the communications terminal 200 may be substantial reduction or removal of the need for synchronization between the communications terminal 200 and a network component that may receive a transmission from the communications terminal 200.

An effect provided by the communications terminal 200 may be provision of a method for UL transmission that may be easily implemented by the communications terminal 200, and that may not require standardization under a radio communications technology.

An effect provided by the communications terminal 200 may be provision of a method for UL transmission that may be substantially reduce or remove the need for complicated designs at a transmitter and/or receiver of a radio communications network.

An effect provided by the communications terminal 200 may be improved demodulation performance at a network component that may receive a transmission from the communications terminal 200.

An effect provided by the communications terminal 200 may be optimized use of network resources (e.g. time slot, frequency bandwidth, channel access code, etc.) of a radio communications network.

Figure 3:
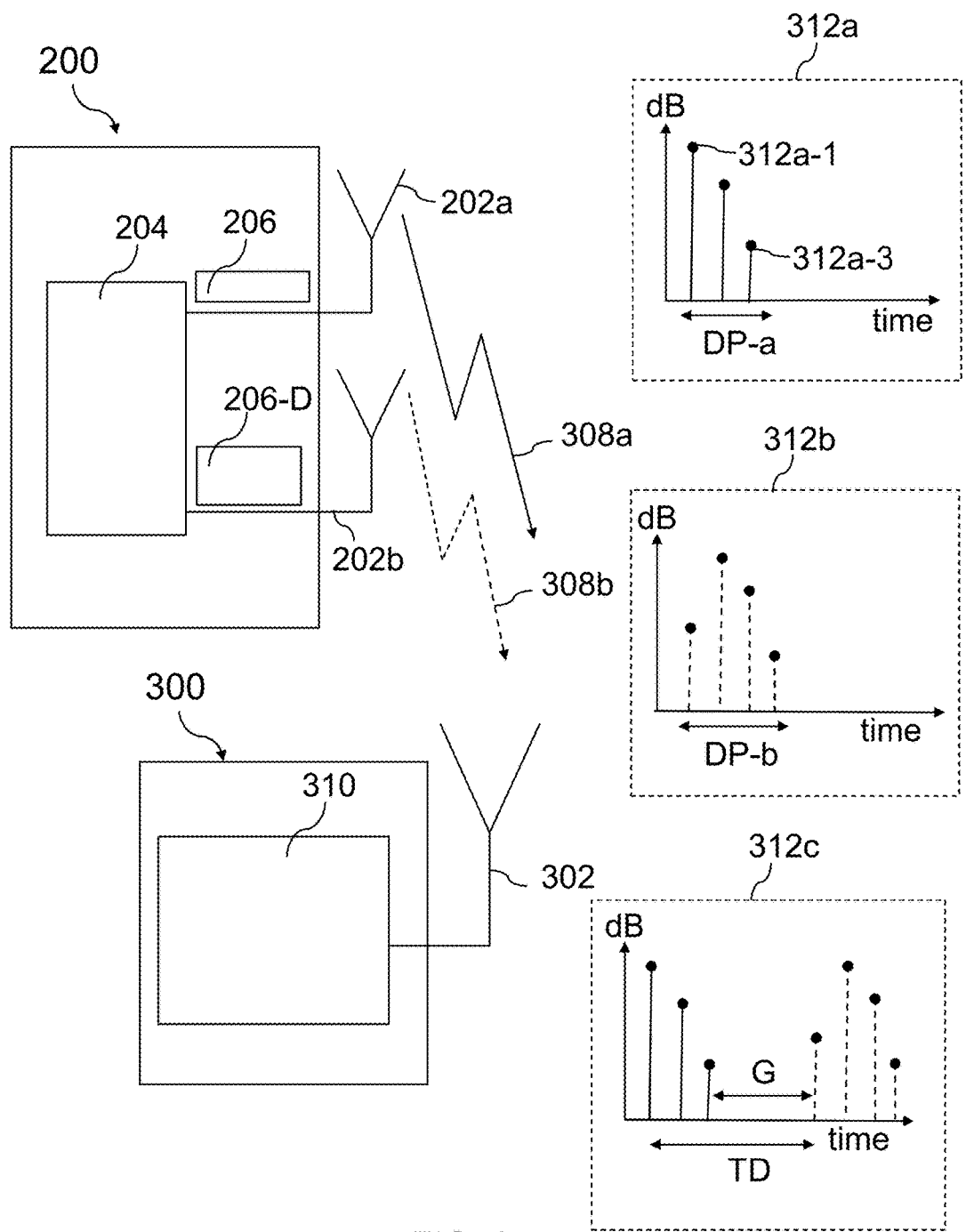
FIG. 3 shows a block diagram illustrating communications channels between a communications terminal and a network component.

FIG. 3 shows a block diagram illustrating communications channels 308a, 308b between the communications terminal 200 and a network component 300.

Reference signs in FIG. 3 that are the same as in FIG. 2 denote the same or similar elements as in FIG. 2. Thus, those elements will not be described in detail again here; reference is made to the description above. Differences between FIG. 3 and FIG. 2 are described below.

The network component 300 may include at least one antenna 302 and a receiver 310.

Only one antenna 302 is shown as an example, however the number of antennas may be greater than one, and may, for example, be two, three, four, five, six, seven, eight, nine, or on the order of tens, or even more antennas.

The network component 300 may include, or may be, a component of a radio communications network. For example, the network component 300 may include, or may be, at least one of a base station, a NB (Node B), an eNB (Evolved Node B), a Home NB, and a traditional NB, although other network components may be possible as well.

The receiver 310 may be configured in accordance with a 3G communications technology (e.g. Wideband CDMA technology, CDMA2000 technology), although the receiver 310 may be configured in accordance with other communications technologies as well, such as, for example, communications technologies introduced before 3G communications technology (e.g. 2G communications technology, such as for example legacy systems, OFDM (Orthogonal Frequency Division Multiplexing) systems, etc.), or communications technologies introduced after 3G communications technology, for example 4G communications technology (e.g. LTE communications technology).

The receiver 310 may be configured to receive a signal on the at least one antenna 302 (e.g. an UL signal, for example an 3G UL signal transmitted from the communications terminal 200 to the network component 300). The receiver 310 of the network component 300 may, for example, be configured to perform at least one of demodulation, decoding, equalization, and interference cancellation, although other operations by the receiver 310 may be possible as well. The receiver 301 may, for example, include, or may be, at least one of an equalizer circuit and an interference cancelling circuit, although other circuits may be possible as well.

The word "circuit" is used herein to mean any kind of a logic implementing entity, which may be special purpose circuitry or processor executing software stored in a memory, firmware, or any combination thereof. Thus, in one or more examples, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Different circuits can thus also be implemented by the same component, e.g. by a processor executing two different programs.

The network component 300 may include a plurality of antennas 302. In such an example, the receiver 310 may, for example, include, or may be, one or more rake receivers. The receiver 310 (e.g. at least one rake receiver) may be configured to perform at least one of selection combining, equal combining, switched combining or maximal ratio combining, although other combination schemes may be possible as well.

As shown in FIG. 3, there may be communications channels 308a, 308b between the communications terminal 200 and a network component 300. The communications channel 308a may, for example, illustrate a communications link from the antenna 202a of the communications terminal 200 to the antenna 302 of the network component 300. In other words, the transmitter 204 of the communications terminal 200 may be configured to transmit the signal 206 on the antenna 202a to the network component 300 over the communications channel 308a. Stated in yet another way, the communications channel 308a may be an UL channel from the antenna 202*a* to the antenna 302. Similarly, the communications channel 308*b* may, for example, illustrate a communications link from the antenna 202*b* of the communications terminal 200 to the antenna 302 of the network component 300. In other words, the transmitter 204 of the communications terminal 200 may be configured to transmit the delayed signal 206-D on the antenna 202*b* to the network component 300 over the communications channel 308*b*. Stated in yet another way, the communications channel 308*b* may be an UL channel from the antenna 202*b* to the antenna 302.

Each of the communications channels 308*a* and 308*b* may, for example, be characterized a respective PDP (power delay profile). For example, the communications channel 308*a* may be characterized by a PDP 312*a*, and the communications channel 308*b* may be characterized by a PDP 312*b*. The PDPs 312*a*, 312*b* shown in FIG. 3 are examples, and not meant to be limiting.

A PDP may, for example, illustrate an intensity (e.g. power) of a signal received on a channel as a function of time. For example, the PDP 312*a* shown in FIG. 3 may illustrate the intensity of the signal 206 (intensity indicated as "dB" on the vertical axis of the PDP 312*a*) received by the receiver 302 at the antenna 302 over the communications channel 308*a* as a function of time (indicated as "time" on the horizontal axis of PDP 312*a*). The communications channel 308*a* may, for example, be a multipath channel. In other words, the signal 206 may reach the antenna 302 of the network component 300 via more than one path. Accordingly, the PDP 312*a* may indicate the intensity (e.g. power) of the signal 206 received on each path of the communications channel 308*a* (e.g. multipath channel) as a function of time. The PDP 312*a* may, for example, be characterized by a delay parameter DP-a. The delay parameter DP-a may be referred to as the delay parameter DP-a of the PDP 312*a* of the communications channel 308*a*, or simply as the delay parameter DP-a of the communications channel 308*a*. The delay parameter DP-a of the communications channel 308*a* may, for example, be interpreted as a difference between the time of arrival of the earliest multipath component 312*a*-1 (which may, for example, be a line-of-sight component) and the time of arrival of the latest multipath component 312*a*-3. Alternative, or in addition to this, the delay parameter DP-a of the communications channel 308*a* may, for example, include, or may be, a delay spread, for example, a mean excess delay, an RMS (root mean square) delay spread, and a maximum excess delay, although other delay parameters may be possible as well.

In like manner, the PDP 312*b* shown in FIG. 3 may illustrate the intensity of the delayed signal 206-D (indicated as "dB" on the vertical axis of the PDP 312*b*) received by the receiver 302 at the antenna 302 over the communications channel 308*b* as a function of time (indicated as "time" on the horizontal axis of PDP 312*b*). The PDP 312*b* of the communications channel 308*b* is plotted on the same scale as the PDP 312*b* of the communications channel 308*a*. The communications channel 308*b* may, for example, be a multipath channel. However, the antenna 202*b* and the antenna 202*a* of the communications terminal 200 may, for example, be separated by a finite distance. By way of another example, the antenna 202*a* and the antenna 202*a* of the communications terminal 200 may face slightly different directions. Accordingly, the number of paths and/or the nature of the paths for the communications channel 308*b* may be different from communications channel 308*a*. In other words, the fading experienced by the delayed signal 206-D transmitted over the communications channel 308*a* may be different from the fading experienced by the signal 206 transmitted over the communications channel 308*b*. Accordingly, the PDP 312-*b* of the communications channel 308*b* may show a different profile than the PDP 312*a* of the communications channel 308*a*.

The PDP 312*b* may, for example, be characterized by a delay parameter DP-b, which may be interpreted in a similar way as the delay parameter DP-a of the PDP 312*a*. The delay parameter DP-b of the communications channel 308*b* may, for example, include, or may be, a delay spread, for example, a mean excess delay, an RMS (root mean square) delay spread, and a maximum excess delay, although other delay parameters may be possible as well.

As described above, the delayed signal 206-D may be a time-delayed version of the signal 206. In other words, the delayed signal 206-D may be the signal 206 transmitted on the antenna 202*b* of the communications terminal 200 at a time delay TD after the transmission of the signal 206 on the antenna 202*a* of the communications terminal 200. Stated in yet another way, the signal 206 may be delayed by a time delay TD and transmitted as the delayed signal 206-D on the antenna 202*b* of the communications terminal 200. Accordingly, a PDP 312*c* seen at the antenna 302 of the network component 300 may be a superposition (e.g. addition) of the PDP 312*a* of the communications channel 308*a* and a time-delayed version of the PDP 312*b* of the communications channel 308*b*, wherein the delay of the PDP 312-*b* of the communnications channel 308*b* may be at least substantially equal to the time delay TD.

Since the PDP 312*c* seen at the antenna 302 of the network component 300 may be a superposition (e.g. addition) of the PDP 312*a* of the communications channel 308*a* and a time-delayed version of the PDP 312*b* of the communications channel 308*b*, a signal received at the antenna 302 due to a transmission by the communications terminal 200 may, for example, be distinguished into at least two parts, wherein each part of the signal received at the antenna 302 may be attributed to each of the communications channel 308*a* and 308*b*. In other words, the signal received at the antenna 302 due to a transmission over the communications channel 308*a* may be distinguished from the signal received at the antenna 302 due to a transmission over the communications channel 308*b*. It may be observed in the PDP 312*c* shown in FIG. 3 that the ability to attribute parts of the signal received at the antenna 302 to different communications channels may depend on the delay parameters DP-a, DP-b of each of the channels 308*a*, 308*b* (e.g. UL channels) from the communications terminal 200 to the network component 300. For example, the time delay TD may need to be set to be greater than the delay parameter DP-a in order for there to be distinguishable parts in the PDP 312*c*. In such an example, the gap G between the respective parts may be greater than zero.

In light of the above description, it may be seen that the time delay TD may be intentionally introduced at the communications terminal 200 in order to enable the receiver 310 (e.g. a rake receiver) to distinguish between transmission paths between each antenna 202*a*, 202*b* of the communications terminal 200 and each antenna 302 of the network component 300. The ability of the receiver 310 (e.g. a rake receiver) to distinguish between transmission paths may allow the receiver 310 (e.g. a rake receiver) to implement a demodulation scheme that may combine the energy of the paths in the best possible manner (e.g. by maximal ratio combining, equal combining, etc.). The ability of the receiver 310 to distinguish between transmission paths may provide a diversity gain to the receiver 310, and may, for example, improve the performance (e.g. demodulation performance) of the receiver 310. For example, a block error rate of signals received by the receiver 310 of the network component 300 may be reduced.

FIG. 4A to FIG. 4E show results obtained from simulations that illustrate an effect provided by the communications terminal 200.

FIG. 4A to FIG. 4E show block error rates (BLER) obtained by applying the above-described procedure to a communications terminal 200 configured according to a UMTS/CDMA communications technology. In other words, FIG. 4A to FIG. 4E illustrate the BLER obtained by transmitting the signal 206 on the antenna 202a, and the delayed signal 206-D, which is a time-delayed version of the signal 206, on the antenna 202b.

FIG. 4A to FIG. 4E illustrate the BLER obtained for various time delays TDs. In particular, time delays TDs of 10 μs (indicated as "TxDD 10 μs offset" and having reference sign 40x-3), 260 ns (indicated as "TxDD 260 ns offset" and having reference sign 40x-5), and 500 ns (indicated as "TxDD 500 ns offset" and having reference sign 40x-4) are used. For example, "TxDD 10 μs offset" may indicate a case where the signal 206 is transmitted on the antenna 202a at a particular time T, and where the delayed signal 206-D, which is the signal 206 delayed by 10 μs, is transmitted on the antenna 202b at a time (T+10 μs). It is noted that the maximum delay specified by 3GPP may be about 20 μs. Accordingly, the curves in FIG. 4A to FIG. 4E indicated as "TxDD 10 μs offset" may be obtained by applying a time delay TD that is approximately equal to about half the maximum delay specified by 3GPP. It is further noted that a chip duration for UMTS may be about 260 ns. Accordingly, the curves indicated as "TxDD 260 ns offset" may be obtained by applying a time delay TD that is approximately equal to about the chip duration specified by UMTS.

In addition, FIG. 4A to FIG. 4E illustrate the BLER obtained for a time delay TD of zero (indicated as "TxDD no offset" and having reference sign 40x-2). In other words, "TxDD no offset" may indicate a procedure in which there is no time delay between the signal 206 transmitted on antenna 202a and the signal 206-D transmitted on antenna 202b. Stated in another way, the curves in FIG. 4A to FIG. 4E indicated as "TxDD no offset" may be obtained when the communications terminal 200 transmits signal 206 at the same time from both the antennas 202a and 202b. Furthermore, FIG. 4A to FIG. 4E illustrate the BLER obtained when the above described procedure is not used (indicated as "no TxDD" and having reference sign 40x-1). In other words, "no TxDD" may indicate a case where signal 206 is transmitted on the antenna 202a, and no signal is transmitted on the antenna 202b. The BLERs for the indication "no TxDD" may, for example, be obtained for the terminal 102 shown in FIG. 1 where only one antenna is used to transmit a UL signal from the terminal 102 to one or more of the network components 106a, 106b, 106c.

The simulations performed to obtain the results shown in FIG. 4A to FIG. 4E assumed a UMTS Rel. 99 DL channel from the network component 300 to the communications terminal 200. However, it is noted that the above described procedure (namely, delaying the signal 206 and transmitting the delayed signal on antenna 202b) may also be applied to a 2G communications technology, LTE communications technology, OFDM communications system, or a communications system configured according to any other radio communications technology.

The simulations performed assumed that the receiver 310 of the network component 300 includes a rake receiver. However, it is noted that the receiver 310 may, instead, include a plurality of rake receivers and/or an equalizing circuit and/or an interference cancelling circuit.

Other parameters used in the simulations include using the CPICH (Common Pilot Channel) and the DPCH (Dedicated Physical Channel) between the communications terminal 200 and the network component 300, whilst turning off (i.e. disabling) all other channels between the communications terminal 200 and the network component 300. In addition, the simulations also assume that the OCNS (Orthogonal Channel Noise Simulator) is disabled. In other words, the simulations assume that other terminals do not communicate with the network component 300 in a synchronous manner Stated differently, other terminals (e.g. other users) are assumed to be transmitting UL signals in an asynchronous manner, and interference from these other terminals are simulated by including them in the power spectral density of a band-limited white noise source (indicated as $I_{OC}$ in FIG. 4A to FIG. 4E). Furthermore, a 12.2 kbps RMC (Reference Measurement Channel) according to 3GPP is assumed. Using these assumptions, the BLER of a first radio bearer of the 12.2 kpbs RMC is plotted versus the $E_c/I_{OR}$ of the DPCH. The abbreviation $E_c$ may be a measure of the transmit power spectral density of a particular channel, whilst the abbreviation $I_{OR}$ may be a measure of the total transmit power spectral density. In other words, $I_{OR}$ may be a measure of the power spectral density of all signals transmitted by the network component 300. Accordingly, the $E_c/I_{OR}$ of the DPCH may be a measure of the proportion of the total transmit power spectral density that is allocated to the DPCH.

FIG. 4A to FIG. 4E each show two sets of curves 402 and 404. The first set of curves 402 include simulation results for a $I_{OC}/I_{OR}$ of 7 dB, and the second set of curves 404 include simulation results for a $I_{OC}/I_{OR}$ of −3 dB.

Figure 4A:
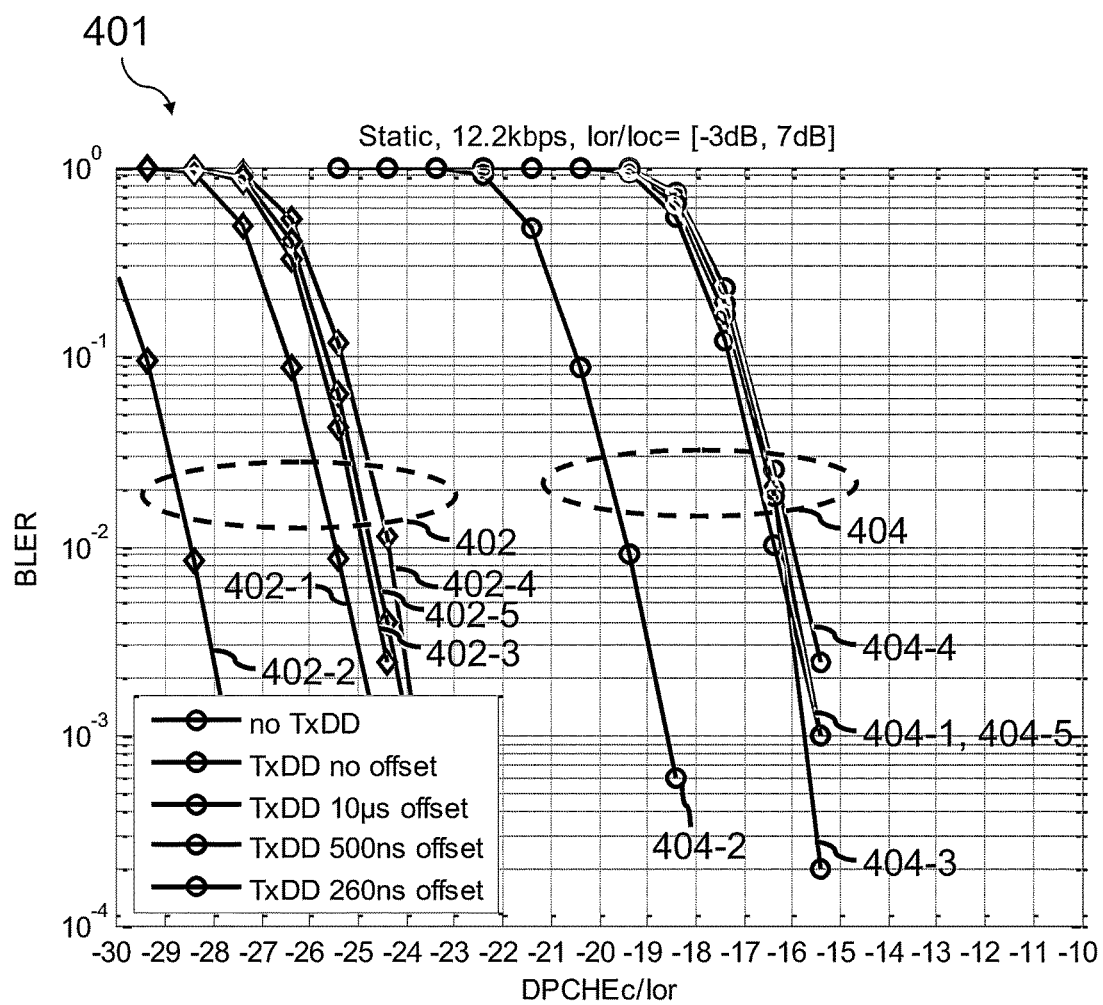
FIG. 4A to FIG. 4E show results obtained from simulations that illustrate an effect provided by a communications terminal.

FIG. 4A shows simulation results 401 for a static 3GPP channel.

Figure 4B:
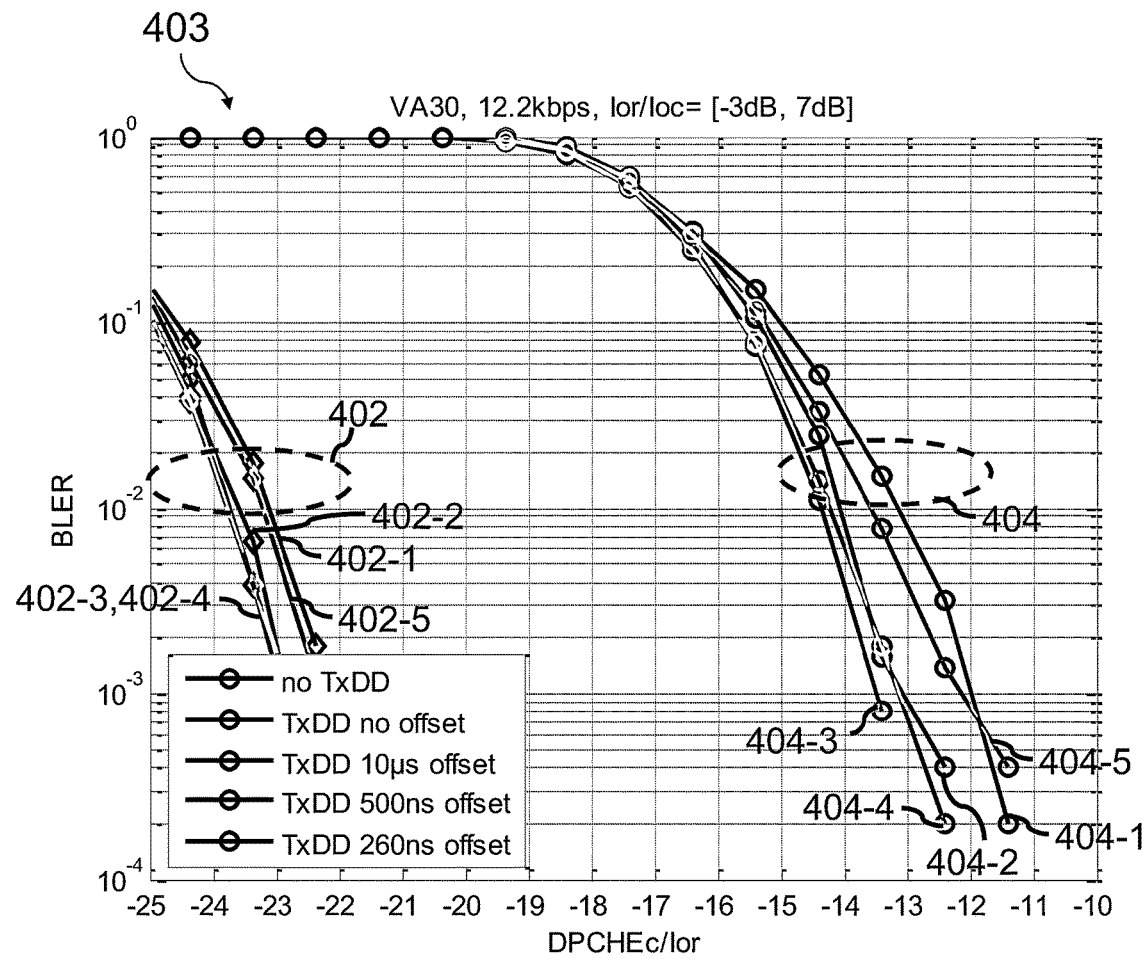

FIG. 4B shows simulation results 403 for an ITU (International Telecommunication Union) Vehicular A, 30 km/h 3GPP Channel (indicated as VA30).

Figure 4C:
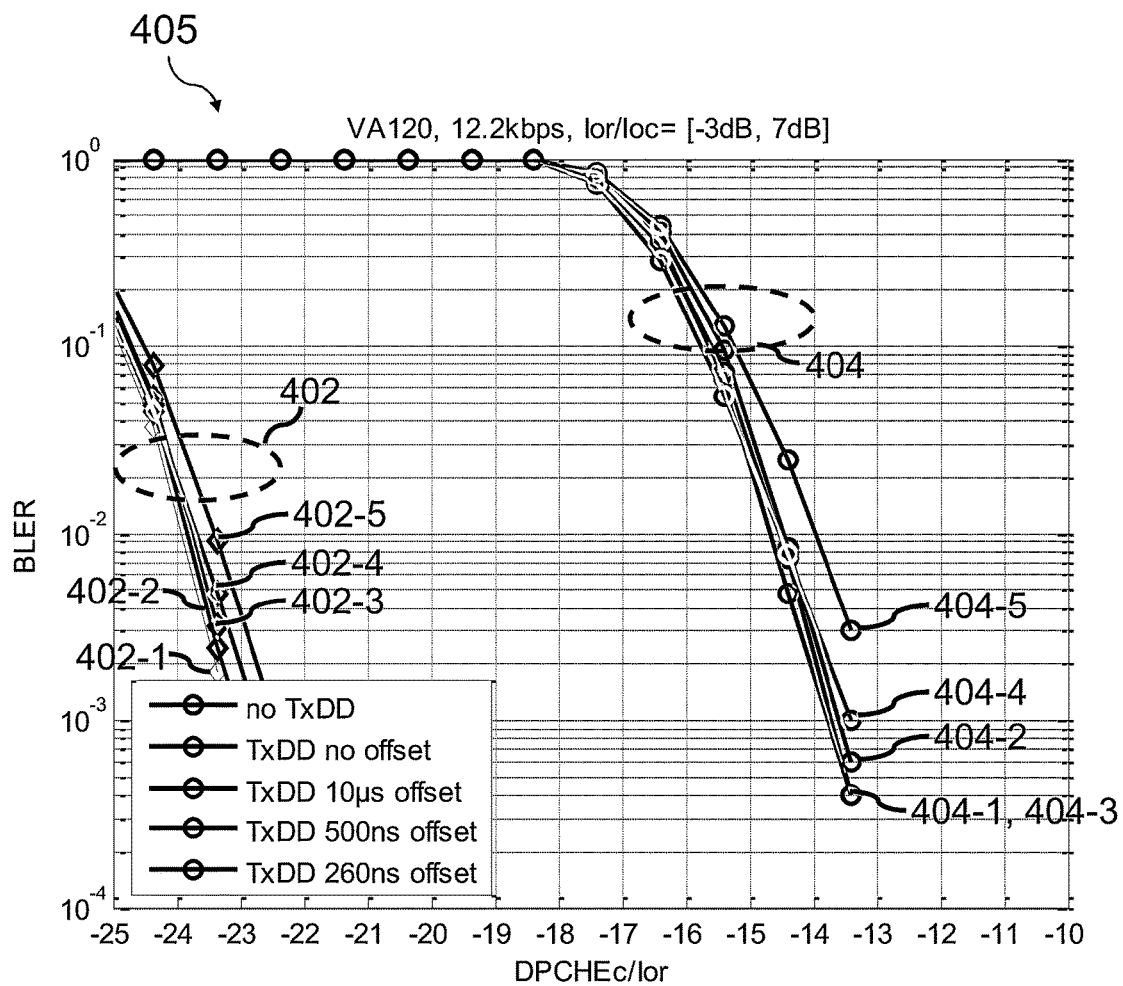

FIG. 4C shows simulation results 405 for an ITU Vehicular A, 120 km/h 3GPP Channel (indicated as VA120).

Figure 4D:
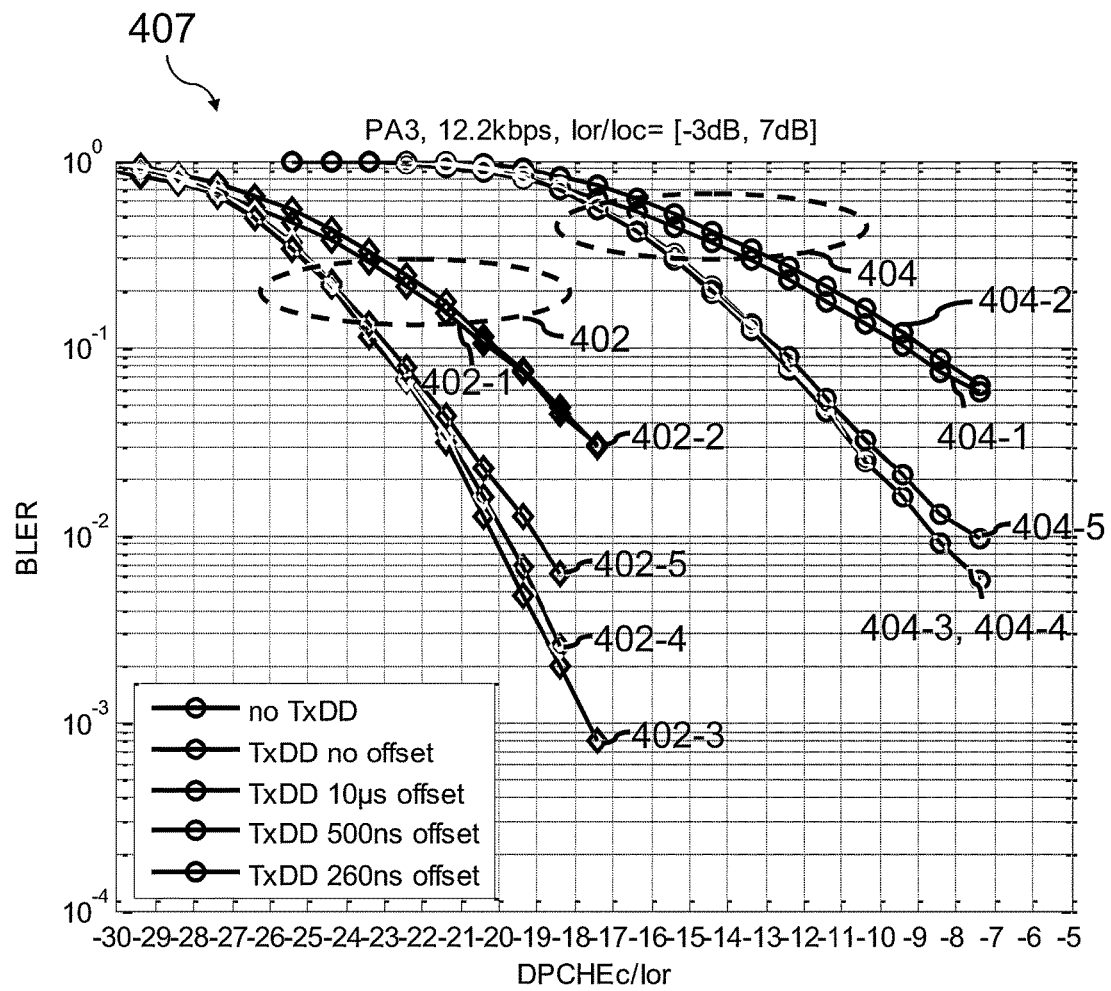

FIG. 4D shows simulation results 407 for an ITU Pedestrian A, 3 km/h 3GPP Channel (indicated as PA3).

Figure 4E:
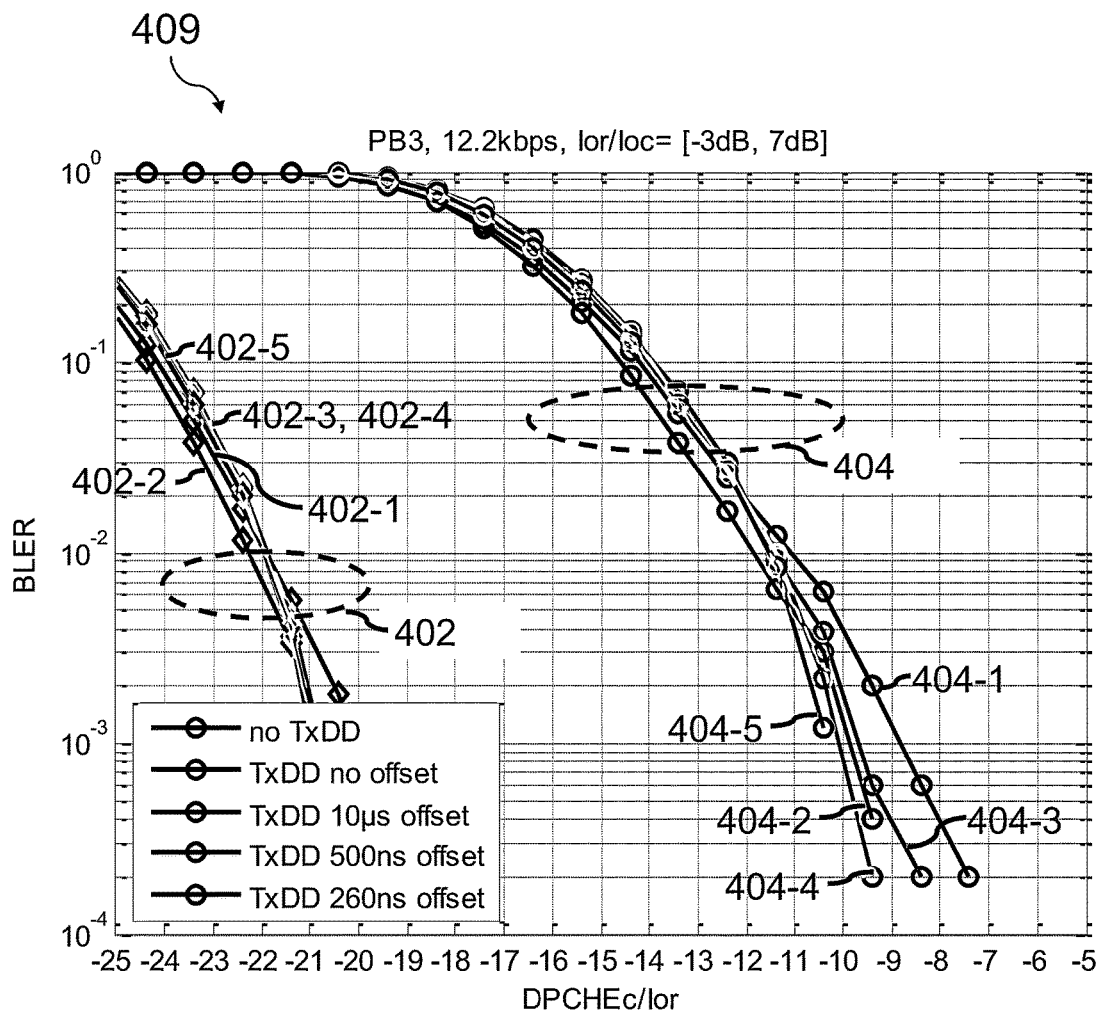

FIG. 4E shows simulation results 409 for an ITU Pedestrian B, 3 km/h 3GPP Channel (indicated as PB3).

Table 1 shows a summary of parameters of the ITU channels PA3, PB3, VA30 and VA120 including path delay profiles used in the simulations.

TABLE 1

Summary of Parameters of ITU channels PA3, PB3, VA30 and VA120
(taken from 3GPP TS25.101, Section B2.2, Table B.1B)

| ITU Pedestrian A Speed 3 km/h (PA3) | | ITU Pedestrian B Speed 3 km/h (PB3) | | ITU vehicular A Speed 30 km/h (VA30) | | ITU vehicular A Speed 120 km/h (VA120) | |
|---|---|---|---|---|---|---|---|
| Speed for Band I, II, III, IV, IX and X 3 km/h | | Speed for Band I, II, III, IV, IX and X 3 km/h | | Speed for Band I, II, III, IV, IX and X 30 km/h | | Speed for Band I, II, III, IV, IX and X 120 km/h | |
| Speed for Band V, VI, VIII 7 km/h | | Speed for Band V, VI, VIII 7 km/h | | Speed for Band V, VI, VIII 71 km/h | | Speed for Band V, VI, VIII 282 km/h (Note 1) | |
| Speed for Band VII 2.3 km/h | | Speed for Band VII 2.3 km/h | | Speed for Band VII 23 km/h | | Speed for Band VII 92 km/h | |
| Speed for Band XI: 4.1 km/h | | Speed for Band XI: 4.1 km/h | | Speed for Band XI: 41 km/h | | Speed for Band XI: 166 km/h (Note 1) | |
| Speed for Band XII, XIII, XIV 8 km/h | | Speed for Band XII, XIII, XIV 8 km/h | | Speed for Band XII, XIII, XIV 80 km/h | | Speed for Band XII, XIII, XIV 320 km/h | |
| Relative Delay [ns] | Relative Mean Power [Db] | Relative Delay [ns] | Relative Mean Power [Db] | Relative Delay [ns] | Relative Mean Power [Db] | Relative Delay [ns] | Relative Mean Power [Db] |
| 0 | 0 | 0 | 0 | 0 | 0 | 0 | 0 |
| 110 | −9.7 | 200 | −0.9 | 310 | −1.0 | 310 | −1.0 |
| 190 | −19.2 | 800 | −4.9 | 710 | −9.0 | 710 | −9.0 |
| 410 | −22.8 | 1200 | −8.0 | 1090 | −10.0 | 1090 | −10.0 |
|  |  | 2300 | −7.8 | 1730 | −15.0 | 1730 | −15.0 |
|  |  | 3700 | −23.9 | 2510 | −20.0 | 2510 | −20.0 |

As shown in FIG. 4A to FIG. 4E, using a time delay TD may yield a significant gain compared to a procedure in which only one antenna is used for transmitting an UL signal (e.g. compared to curves indicated as "no TxDD" and having reference sign 40x-1). It may be observed that the time delay TD that yields the best performance may not be fixed, and may depend on the channel between the communications terminal 200 and the network component 300. For example, in the simulation results shown in FIG. 4B (i.e. VA30 channel) for $I_{OC}/I_{OR}$ of 7 dB (set 402), a time delay TD of 10 μs (curve and having reference sign 404-3) may yield the best performance, whilst for the simulation results shown in FIG. 4D (i.e. PA3 channel) for $I_{OC}/I_{OR}$ of −3 dB (set 404), a time delay TD of 500 ns (curve having reference sign 404-3) may yield the best performance. Accordingly, the time delay TD may be variable, and may need to be controlled. In other words, the time delay TD may have to be determined for each antenna of the plurality of antennas 200 which transmits a delayed version of the signal 206.

Furthermore, it is noted that for the case of the static channel shown in FIG. 4A, the simulation results for "TxDD no offset" and having reference sign 40x-2 may not be realistic since in the simulations, the respective paths between the antenna 202a or antenna 202 of the communications terminal 200 and the antenna 302 of the network component 300 may add coherently. However, in a real world scenario, the respective paths may fade slowly, and this fading may be independent. Accordingly, it may be expected that on average, the simulation results for "TxDD no offset" (i.e. time delay TD=0) and having reference sign 40x-2 may be substantially equal to the simulation results for "no TxDD" (i.e. using only one antenna for an UL transmission) and having reference sign 40x-1.

Figure 5:
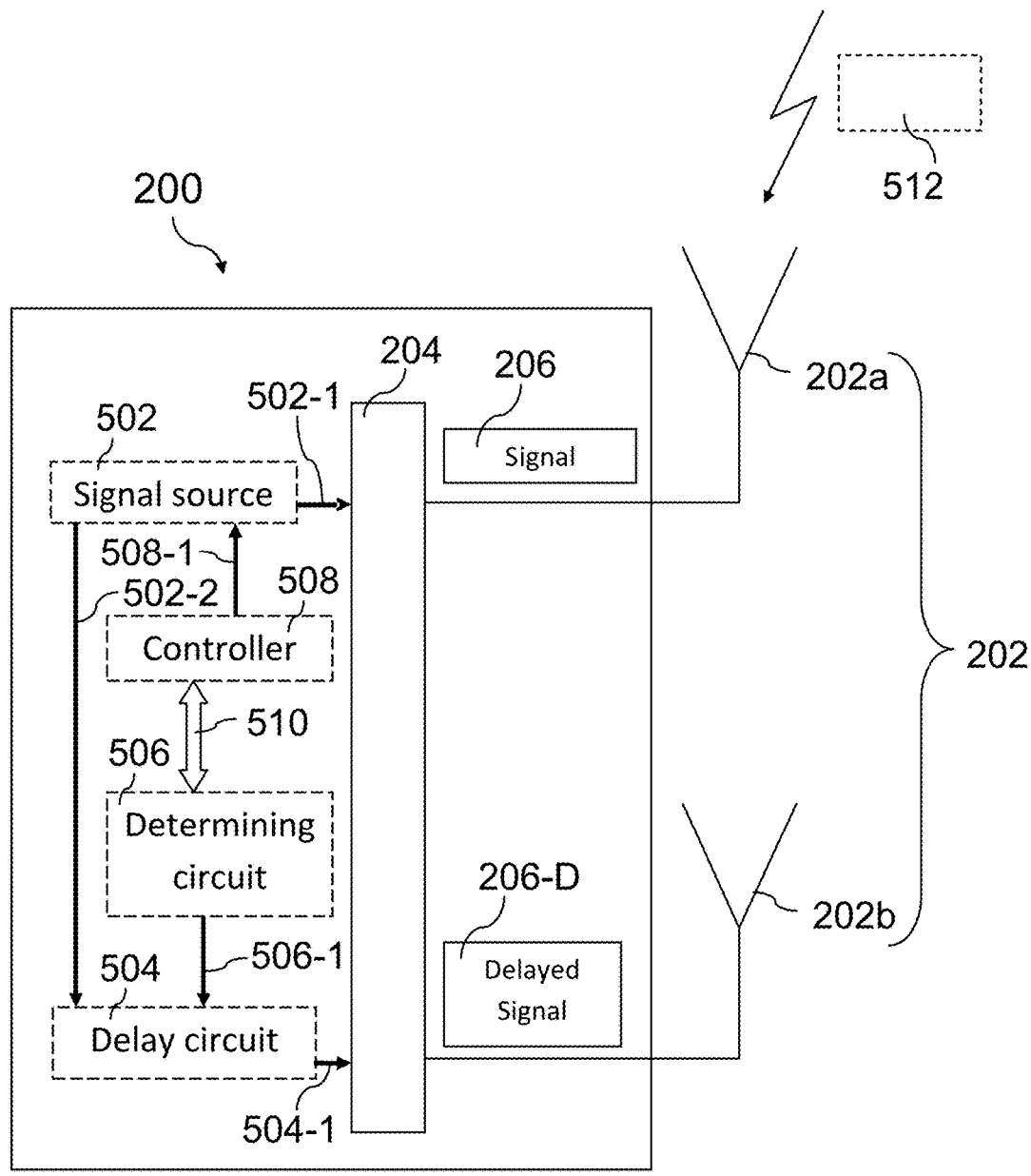
FIG. 5 shows a communications terminal including a signal source, a delay circuit, a determining circuit, and a controller.

FIG. 5 shows the communications terminal 200 including a signal source 502, a delay circuit 504, a determining circuit 506, and a controller 508.

Reference signs in FIG. 5 that are the same as in FIG. 2 denote the same or similar elements as in FIG. 2. Thus, those elements will not be described in detail again here; reference is made to the description above. Differences between FIG. 5 and FIG. 2 are described below.

The signal source 502 and/or the delay circuit 504 and/or the determining circuit 506 and/or the controller 508 may be implemented by means of a circuit, for example, a digital circuit and/or an analog circuit. The word "circuit" is used herein to mean any kind of a logic implementing entity, which may be special purpose circuitry or processor executing software stored in a memory, firmware, or any combination thereof. Thus, in one or more examples, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Different circuits can thus also be implemented by the same component, e.g. by a processor executing two different programs.

As shown in FIG. 5, the communications terminal 200 may include a signal source 502. The signal source 502 may, for example, be configured to provide the signal 506 to the transmitter 204 (provision of the signal 206 to the transmitter 204 is indicated in FIG. 5 as the arrow 502-1). The signal source 502 may be further configured to provide the signal 506 to the delay circuit 504 (provision of the signal 206 to delay circuit 504 is indicated in FIG. 5 as the arrow 502-2).

As described above, the delayed signal 206-D may be a time-delayed version of the signal 206. Consequently, the delay circuit 504 may be configured to generate the delayed signal 206-D by delaying the signal 206 by a time delay TD. The delay circuit 502 may, for example, include, or may be, a digital circuit. In such an example, the time delay TD may be a digital delay, which may, for example be implemented by means of storing In-phase and Q-phase digital RF samples in a digital circuit. By way of another example, the delay circuit 502 may include, or may be an analog circuit. In such an example, the time delay TD may be an analog delay, which may, for example, be implemented by means of a tape delay.

The delay circuit 504, upon generating the delayed signal 206-D from the signal 206, may be configured to provide the delayed signal 206-D to the transmitter (provision of the delayed signal 206-D to the transmitter 204 is indicated as arrow 504-1 in FIG. 5). The transmitter 204 may, for example, transmit the delayed signal 206-D on the antenna 202*b* upon receiving the delayed signal 206-D from the delay circuit 504.

As described above, there may be a need to determine the time delay TD. In this regard, the communications terminal 200 may include a determining circuit 506 configured to determine the time delay TD. The delay circuit 504 may, for example, require the time delay TD in order for it (namely, the delay circuit 504) to delay the signal 206 to form the delayed signal 206-D. Accordingly, the determining circuit 506 may be further configured to provide the time delay TD to the delay circuit 504 (provision of the time delay TD to delay circuit 504 is indicated in FIG. 5 as the arrow 506-1).

As shown in FIG. 4A to FIG. 4E, the time delay TD may depend on the channel between the communications terminal 200 and the network component 300. In some channels, for example, the best performance may be obtained when only one antenna is used for transmitting an UL signal (e.g. in a conventional UL signal described above in relation to FIG. 1). In other words, the best performance may be obtained when only the signal 206 is transmitted on antenna 202*a*, and when no signal is transmitted on the antenna 202*b*. This example is distinguished from another example where the time delay TD that yields the best performance is zero. In this other example, two or more antennas 202*a*, 202*b* are used by the communications terminal 200 to transmit the signal 206, except that the delayed signal 206-D is transmitted on the antenna 202*b* at the same time the signal 206 is transmitted on the antenna 202*b*.

As a result, there may be a need for the communications terminal 200 to provide an indication of whether the time delay TD is needed, or not (e.g. which would lead to the case where only one antenna 202*a* is used to transmit the signal 206). In this regard, the communications terminal 200 may include a controller 508. The controller 508 may, for example, be configured to generate a delay instruction in case the time delay TD is determined (e.g. by means of the determining circuit 506) to be greater than or equal to zero. The delay instruction may, for example, indicate that the signal 206 is to be delayed (e.g. by the delay circuit 504). Since generation of the delay instruction may be contingent on the value of the time delay TD (e.g. being greater than or equal to zero), the controller 508 may be communicatively coupled with the determining circuit 506. The communicative coupling between the determining circuit 506 and the controller 508 is indicated as arrow 510 in FIG. 5.

In an example where the time delay TD is determined to be necessary (e.g. where the time delay TD is determined to be greater than or equal to zero), the controller 510 may be configured to provide the delay instruction generated by it to the signal source 502 (provision of the delay instruction to the signal source 502 is indicated as arrow 508-1 in FIG. 5). The signal source 502 may provide the signal 206 to the delay circuit 504, for example, upon receipt of the delay instruction (e.g. from the controller 508). Accordingly, the signal 206 may be provided to the delay circuit 504, for example, when the time delay TD is determined to be necessary.

In another example where the time delay TD is determined to be unnecessary (namely, not needed), the signal source 502 may, for example, forego providing the signal 206 to the delay circuit 504, thus preventing the generation of the delayed signal 206-D. This in turn would lead to an example where only one antenna 202*a* is used by the communications terminal 200 for transmitting an UL signal (e.g. in a conventional UL signal described above in relation to FIG. 1).

The description that follows illustrates how the time delay TD may be determined (e.g. by the determining circuit 506).

The time delay TD may, for example, depend on parameters of the radio communications technology in which the communications terminal 200 operates. For example, it may be assumed that a delay spread (e.g. of a PDP of a UL channel) may be smaller than the maximum delay spread of a radio communications technology. For example, for 3G, the maximum delay spread may be about 20 μs (e.g. with the 3GPP Case2 profile). Accordingly, the time delay TD may, for example, be set as a fraction of the maximum delay spread. For example, the time delay TD may be determined as being approximately half the maximum delay spread. By way of another example, the time delay may be set (e.g. by the determining circuit 506) as being any value less than the maximum delay spread. By way of another example, the time delay TD may, for example, be equal to about the duration of one chip or one symbol in a radio communications technology (e.g. 3G communications technology). For example, in UMTS, the duration of one chip may be about 260 ns, and the time delay TD may be approximately equal to this value.

Alternatively, or in addition to the above, the time delay TD may, for example, be determined (e.g. by the determining circuit 506) based on at least one received signal (e.g. DL signal) received by the plurality of antennas 202 shown in FIG. 2 and FIG. 5.

For example, a communications channel between the communications terminal 200 and the network component 300 may be assumed to be reciprocal. In other words, a PDP of an UL channel between an antenna of the communications terminal 200 and an antenna of the network component 300 may be at least substantially equal to a PDP of a DL channel between the aforementioned antennas. For example, as shown in FIG. 2, the communications channel 308*a* (e.g. a UL communications channel) from the antenna 202*a* of the communications terminal 200 to the antenna 302 of the network component 300 may have a PDP 312*a*. A reciprocal channel may be assumed, in that a communications channel (e.g. a DL communications channel) from the antenna 302 to the antenna 202*a* may be assumed to have a PDP at least approximately equal to the PDP 312*a*.

In a TDD (time-division duplexing) scheme where the communications channel 308*a* (e.g. UL channel) and a communications channel in an opposite direction (e.g. DL channel) use identical frequencies or frequency bands, the PDP of the DL channel may be identical to the PDP 312*a* of the UL channel.

In a FDD (frequency-division duplexing) scheme where the communications channel 308*a* (e.g. UL channel) and a communications channel in an opposite direction (e.g. DL channel) use different frequencies or frequency bands separated by a small amount, the UL channel and the DL channel may be highly correlated. Accordingly, the PDP of the DL channel may be approximately equal to the PDP 312*a*. There may, for example, be small differences, e.g. an additional path and/or slightly different fading on the DL channel.

However, the delay spread of the PDP of the DL channel may not differ much from the UL channel.

Accordingly, the determining circuit 506 may, for example, determine the time delay TD based on a PDP (e.g. a delay spread of the PDP), which may be determined (e.g. estimated or calculated) based on at least one DL signal received at the plurality of antennas 202, for example, from the network component 300.

By way of an example, the time delay TD may be determined to be larger than a delay spread of a PDP determined (e.g. estimated) based on at least one DL signal received at the plurality of antennas 202. For example, in FIG. 3, the delay spread of the PDP of the DL channel from the antenna 302 to the antenna 202a (which may be at least approximately equal to PDP 312a) may be measured as DP-a. Accordingly, the time delay TD applied to the signal 206 to form the delayed signal 206-D may, for example, be greater than DP-a. By way of another example, in FIG. 3, the delay spread of the PDP of the DL channel from the antenna 302 to the antenna 202b (which may be at least approximately equal to PDP 312b) may be measured as DP-b. Accordingly, the time delay TD applied to the signal 206 to form the delayed signal 206-D may, for example, be greater than DP-b. By way of yet another example, the PDP determined (e.g. estimated) from the at least one DL signal received at the plurality of antennas 202 may have a few peaks with large gaps in between the peaks. In such an example, the time delay TD may be determined such that the delayed signal 206-D fits into the gaps of the determined (e.g. estimated) PDP.

By way of yet another example, the PDP determined from the at least one DL signal received at the plurality of antennas 202 may, for example, lead the determining circuit 506 to determine that the time delay TD is zero, or that a time delay TD is not necessary (in which case the delay instruction may not be provided to the signal source 502).

The determining circuit 506 may be configured to determine the time delay TD by means of calculation (e.g. by using the delay spread as a variable), a lookup table (e.g. by looking up a particular time delay TD for a particular delay spread).

In addition, or alternatively, to determining the time delay TD based on a delay spread of a PDP determined from the at least one DL signal received at the plurality of antennas, the determining circuit may be configured to determine the time delay based on any one of, or any combination of the following parameters which may be determined from the at least one DL signal received at the plurality of antennas: a signal-to-noise ratio, a signal power, a frequency offset, and a velocity (e.g. velocity of the communications device 200), although other parameters may be possible as well.

Furthermore, there may be other parameters that may affect the determination of the time delay TD by the determining circuit. For example, the determining circuit 506 may be configured to determine the time delay TD based on a transmit power (e.g. a maximum transmit power) of the plurality of antennas 202. By way of another example, the time delay TD may be determined based on proximity information, namely, information that may indicate whether an antenna of the plurality of antennas 202 may be covered, for example, by a hand of a user. Furthermore, the time delay TD may be determined based on typical PDPs and/or delay spreads in a location known to the communications terminal 200 (e.g. urban or rural; highway speeds; outdoor or indoor, etc.).

In addition, the time delay TD may be determined based on knowledge of the receiver 310. For example, if the receiver 310 includes, or is, an equalizer, the best time delay TD (e.g. the time delay TD that minimized BLER) may be different compared to a receiver 310 which may include, or may be, a rake receiver. For example, the time delay TD for a receiver 310 including an equalizer may be smaller than the time delay TD for a receiver 310 including a rake receiver. This may be a consequence of the equalizer having a smaller window than the rake receiver, and that the combined PDP at the receiver 310 may be adapted to fit within the window of the receiver 310.

The time delay TD may change at certain intervals of time and/or in certain events. In other words, the time delay TD may be adapted based on intervals of time and/or events. For example, the time delay TD may not be required intially (which may mean that the delay instruction may not be provided by the controller 508 to the signal source 502), but the time delay TD may be determined to be required after the DL channel is determined. By way of another example, there may be a measurement of the DL channel (e.g. PDP of the DL channel) available to the determining circuit 506 before transmission of signal 206 begins. Accordingly, the time delay TD may be determined based on the measurement of the DL channel before transmission of signal 206 commences.

In a soft-handover (SHO) system, e.g. the UL or DL channel of UMTS, there may be a plurality of network components 300 that may receive the transmitted signal 206 and/or the transmitted delayed signal 206-D. Accordingly, the determining circuit 506 may, for example, make a joint optimization. In other words, the time delay TD may be optimized over the plurality of network components 300. By way of another example, the determining circuit 506 may determine the time delay TD based on an optimization for one of the network components 300. In the SHO system described above, the communications terminal 200 may be able to measure individual path profiles for each antenna 302 of each of the plurality of network components 300. The individual path profiles may, for example, be combined and a time delay TD may be determined from the combined profiles.

The examples described above illustrate that the determining circuit 506 of the communications terminal 200 may be configured to determine the time delay TD based on at least one DL signal received at the plurality of antennas 200.

In addition, or alternatively, the determining circuit 506 may be configured to determine the time delay TD based on feedback information received at the plurality of antennas. The feedback information is indicated as reference sign 512 in FIG. 5. For example, the feedback information 512 may be provided to the communications terminal 200 by a network component (e.g. network component 300) of a radio communications network (e.g. Wideband CDMA system), for example, by means of (e.g. using, or over) a feedback channel. The feedback information 512 may, for example, be determined (e.g. estimated and/or calculated and/or looked-up) by the network component (e.g. network component 300).

By way of an example, the feedback information 512 may include, or may be, the time delay TD. For example, the network component from which the feedback information 512 is received may be configured to determine the time delay TD. In other words, the network component providing the feedback information 512 may be configured to determine the time delay TD, and to include the time delay TD in, or as, the feedback information 512 provided to the communications terminal 200 (e.g. by transmitting to the plurality of antennas 202).

By way of another example, the feedback information 512 may include, or may be, at least one channel parameter determined by a network component.

In other words, the network component from which the feedback information 512 is received may be configured to determine at least one channel parameter. Stated in yet another way, the network component providing the feedback information 512 may be configured to determine at least one channel parameter, and to include the at least one channel parameter in, or as, the feedback information 512 provided to the communications terminal 200 (e.g. by transmitting to the plurality of antennas 202). Thereafter, the determining circuit 506 may, for example, be configured to determine the time delay TD based on the feedback information 512 and/or on the at least one downlink signal received at the plurality of antennas 200.

The at least one channel parameter determined by the network component may be based on at least one UL signal received at the network component. For example, as described above in relation to FIG. 3, the combined PDP 312c may be available at the network component 300 (e.g. at the antenna 302 and/or the receiver 310 of the network component 300). In an example where an initial time delay TD determined by the determining circuit 506 of the communications terminal 200 may be non-zero, the network component 300 (e.g. the receiver 310) may receive a combined PDP (e.g. the PDP 312c). The network component 300 may, for example, be required to determine (e.g. estimate) the individual PDPs of each channel between the antenna 302 and the communications terminal 200 in order to, for example, determine the time delay TD and/or channel parameters.

In an example, the at least one channel parameter may be determined based on a PDP determined (e.g. estimated) from, for example, the at least one UL signal received at the network component. For example, as shown in FIG. 3, the PDP 312c may be available at the network component 300 (e.g. determined from the UL signal on channels 308a and/or 308b). As described above, the PDP 312c may, for example, be determined from the UL signals received over channels 308a and 308b. Accordingly, the network component 300 may, for example, determine a delay spread of the PDP 312c and may, for example, include the delay spread in, or as, the at least one channel parameter.

In addition, or alternatively, to the above, the at least one channel parameter may include, or may be, any one of, or any combination of the following parameters which may be determined from the at least one UL signal received at the network component: a signal-to-noise ratio, a signal power, a frequency offset, and a velocity (e.g. velocity of the communications device 200), although other parameters may be possible as well.

The PDP 312c shown in FIG. 3 is an example where the PDPs of each of the channels 308a, 308b between the antenna 302 and the communications terminal 200 may be easily determined from the at least one UL signal received at the network component 300. However, this may not be the case in other examples. For example, the UL signal (e.g. signal 206) transmitted over the channel 308a may overlap the UL signal (e.g. delayed signal 206) transmitted over the channel 308b. Accordingly, there may be an overlap of UL signals at the network component 300 (e.g. at the antenna 302). Accordingly, it may be necessary to introduce measurement gaps where, for example, transmission of the delayed signal 206-D is disabled. This may allow the network component 300 (e.g. a base station) to easily determine the at least one channel parameter of each individual UL channel between the communications terminal 200 and the network component 300.

Accordingly, the feedback information 512 may include, or may be, an indication to the transmitter 204 of the communications terminal 200 that the transmission of the delayed signal 206-D is to be withheld in order, for example, to determine the at least one channel parameter with ease.

In this regard, there may be several schemes available to send the above-mentioned indication to the transmitter 204. For example, the indication may be sent by the network component 300 to the transmitter 204 at regular time intervals. In other words, there may be regular measurement gaps where the transmitter 204 does not transmit the delayed signal 206-D every X system frames, and uses only one antenna of the plurality of antennas 202 for transmission. For example, the antennas 202a and 202b may be used alternatingly so that both antennas 202a, 202b may be measured. Since the network component 300 knows the position of these gaps, it can easily determine the at least one channel parameter (e.g. PDP) of each individual UL channel between the communications terminal 200 and the network component 300.

Another scheme to send the above-mentioned indication to the transmitter 204 may be to do so irregularly and/or when a particular event occurs. For example, the indication may be sent by the network component 300 to the transmitter 204, when the network component 300 detects that a channel parameter (e.g. a PDP) show some variation, which may indicate that the channel parameter may require an update.

Yet another scheme may be for the network component 300 to detect gaps where an UL signal was previously present. Accordingly, the network component may determine the at least one channel parameter (e.g. PDP) for a particular UL channel when such gaps are detected.

Furthermore, the network component 300 may compare an average sum of the energy received per antenna 202a, 202b of the communications terminal 200. For example, the network component could detect if one of the antennas 202a, 202b of the plurality of antennas 202 is degraded, e.g. because it is covered by a hand or the head. The network component could indicate this is, or as, the feedback information 512 transmitted to the plurality of antennas by a network component 300.

Furthermore, there may be other parameters that may affect the determination of the feedback information 512 by the network component 300. For example, the network component 300 may be configured to determine the feedback information based on a transmit power (e.g. a maximum transmit power) of the network component. By way of another example, the feedback information 512 may be determined based on typical PDPs and/or delay spreads in a location known to the network component 300 (e.g. urban or rural; highway speeds; outdoor or indoor, etc.). By way of yet another example, the feedback information 512 may be determined based on knowledge of a location of the communications terminal 200 (e.g. by triangulation with other network components).

In a soft-handover (SHO) system, e.g. the UL or DL channel of UMTS, there may be a plurality of network components 300 that may receive the transmitted signal 206 and/or the transmitted delayed signal 206-D from a single communications terminal 200. In such an example, the plurality of network components 300 may synchronize the respective feedback information 512 and/or may provide the respective feedback information 512 over a common feedback channel. Since each network component of the plurality of network components may be at different locations, the respective feedback information 512 may be different (e.g. different PDPs). Accordingly, the determining circuit 506 may, for example, make a joint optimization of the time delay TD based on the feedback information 512 from each network component.

If the network component 300 includes, or is, for example a NodeB, the network component 300 may know also all the other transmitters in its range and may be able to measure the interference detected or determined for a particular UL channel. For example, the network component (e.g. NodeB) may know the timing, path profiles, and power levels of all the other transmitters 204 in its range. The network component 300 could then take this information into account and optimize the feedback information 512 (e.g. a determined time delay TD) for a particular UL channel such that the interference from the other UL channels is minimized.

Figure 6:
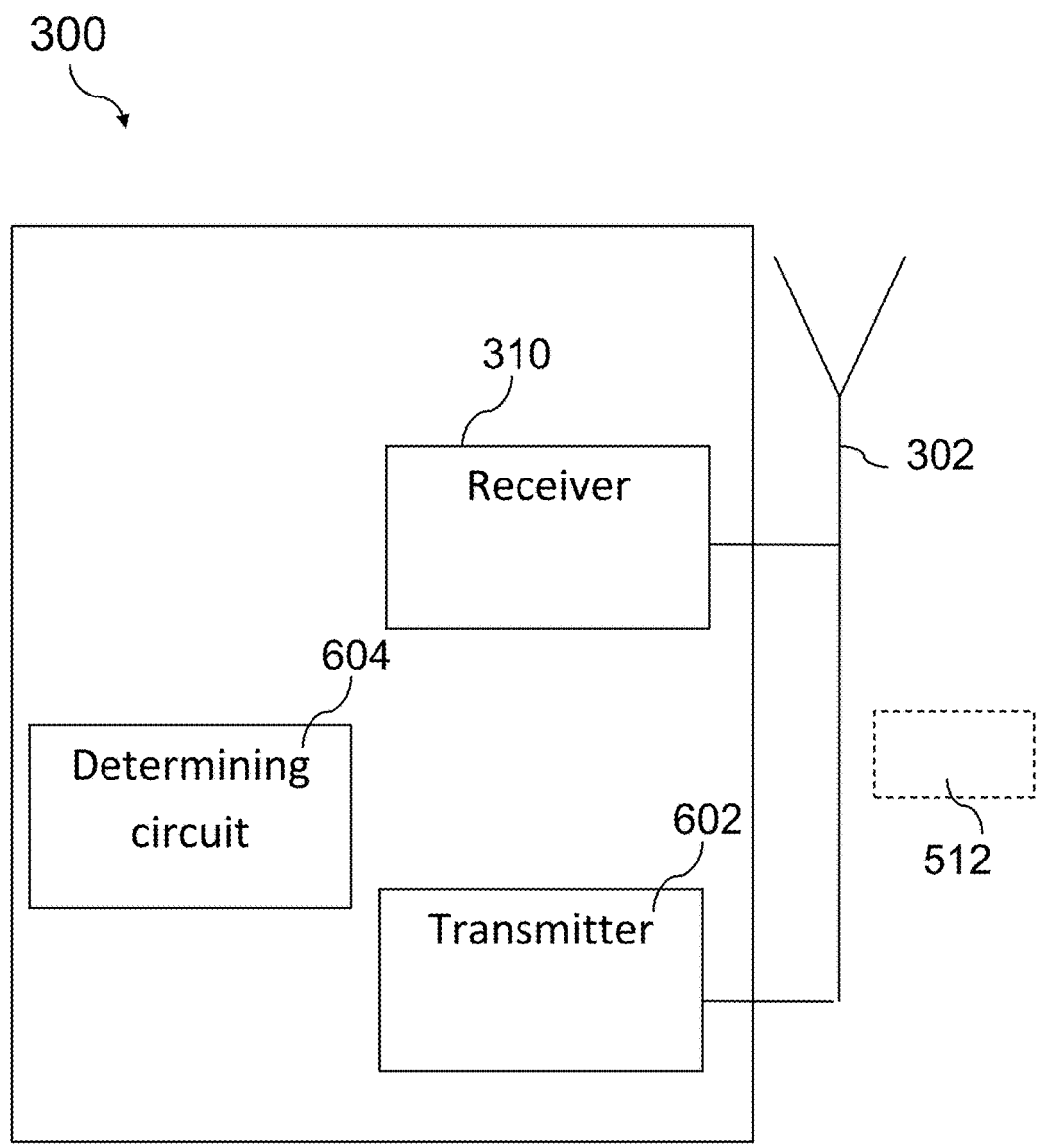
FIG. 6 shows a block diagram of a network component.

FIG. 6 shows a block diagram of the network component 300.

Reference signs in FIG. 6 that are the same as in FIG. 3 denote the same or similar elements as in FIG. 3. Thus, those elements will not be described in detail again here; reference is made to the description above. Differences between FIG. 6 and FIG. 3 are described below.

The network component 300 (e.g. a NodeB) may include at least one antenna 302 and a receiver 310.

As described above, the feedback information 512 may include, or may be, at least one channel parameter determined by the network component 300 based on at least one uplink signal received at the network component 300. Accordingly, the receiver 310 may, for example, be configured to receive at least one uplink signal on the at least one antenna 302.

As described above, the feedback information 512 may be transmitted to the plurality of antennas 202 of the communications terminal 200 by the network component 300. Therefore, the network component 300 may include a transmitter 602 configured to transmit feedback information 512 to the communications terminal 200 on the at least one antenna 302.

As described above, the feedback information 512 may be determined (e.g. estimated and/or calculated and/or looked-up) by the network component (e.g. network component 300).

Accordingly, the network component 300 may include a determining circuit 604 configured to determine the feedback information 512 based on the at least one UL signal received on the at least one antenna 302.

The further features described above with respect to the feedback information 512 shown in FIG. 2 may be applicable to the feedback information 512 shown in FIG. 6.

Figure 7:
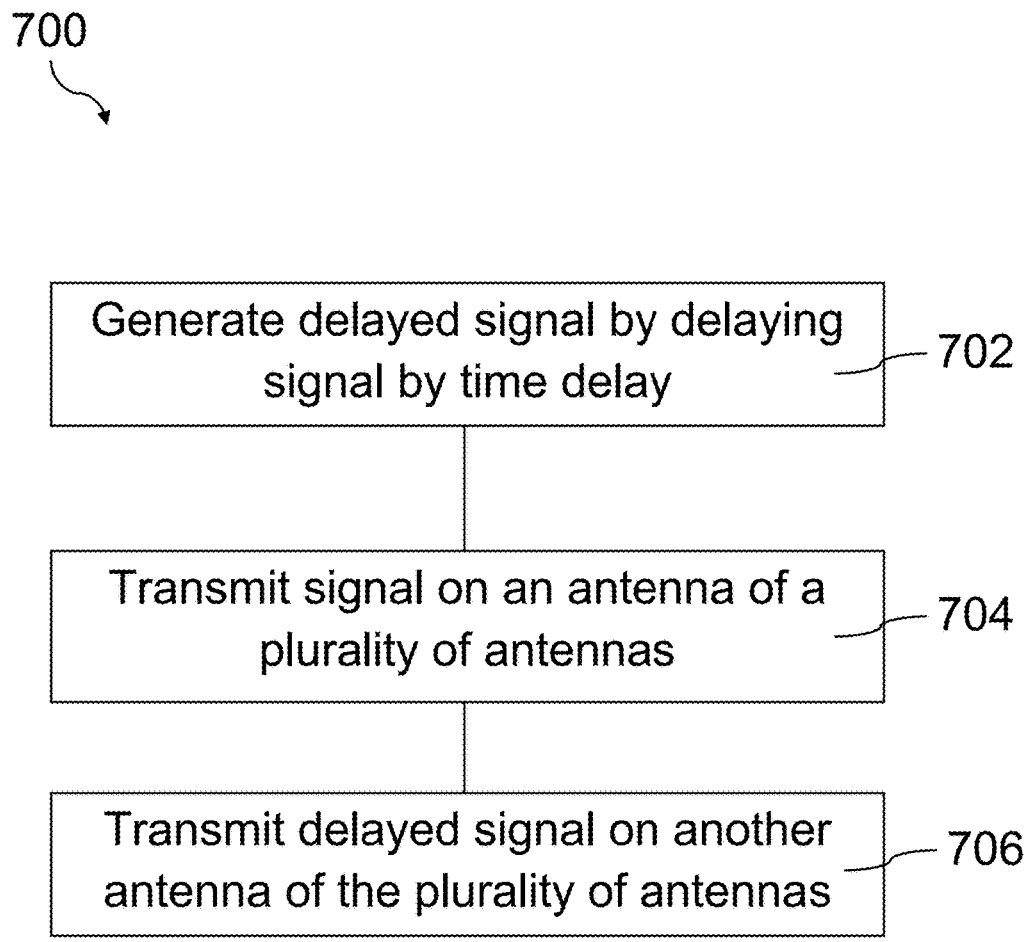
FIG. 7 shows a method for transmitting a signal.

FIG. 7 shows a method 700 for transmitting a signal. The method 700 may include: generating a delayed signal by delaying the signal by a time delay (in 702); transmitting the signal on an antenna of a plurality of antennas (in 704); and transmitting the delayed signal on another antenna of the plurality of antennas (in 706). The delayed signal may have an at least substantially similar signal form as the signal.

FIG. 7 may, for example, be used by the communications terminal 200 shown in FIG. 2 to transmit the signal 206 and the delayed signal 206-D to a network component (e.g. eNB). Accordingly, transmitting the signal on the antenna of the plurality of antennas (in 704) may include transmitting a first uplink signal, and transmitting the delayed signal on the other antenna of the plurality of antennas (in 706) may include transmitting a second uplink signal.

Figure 8:
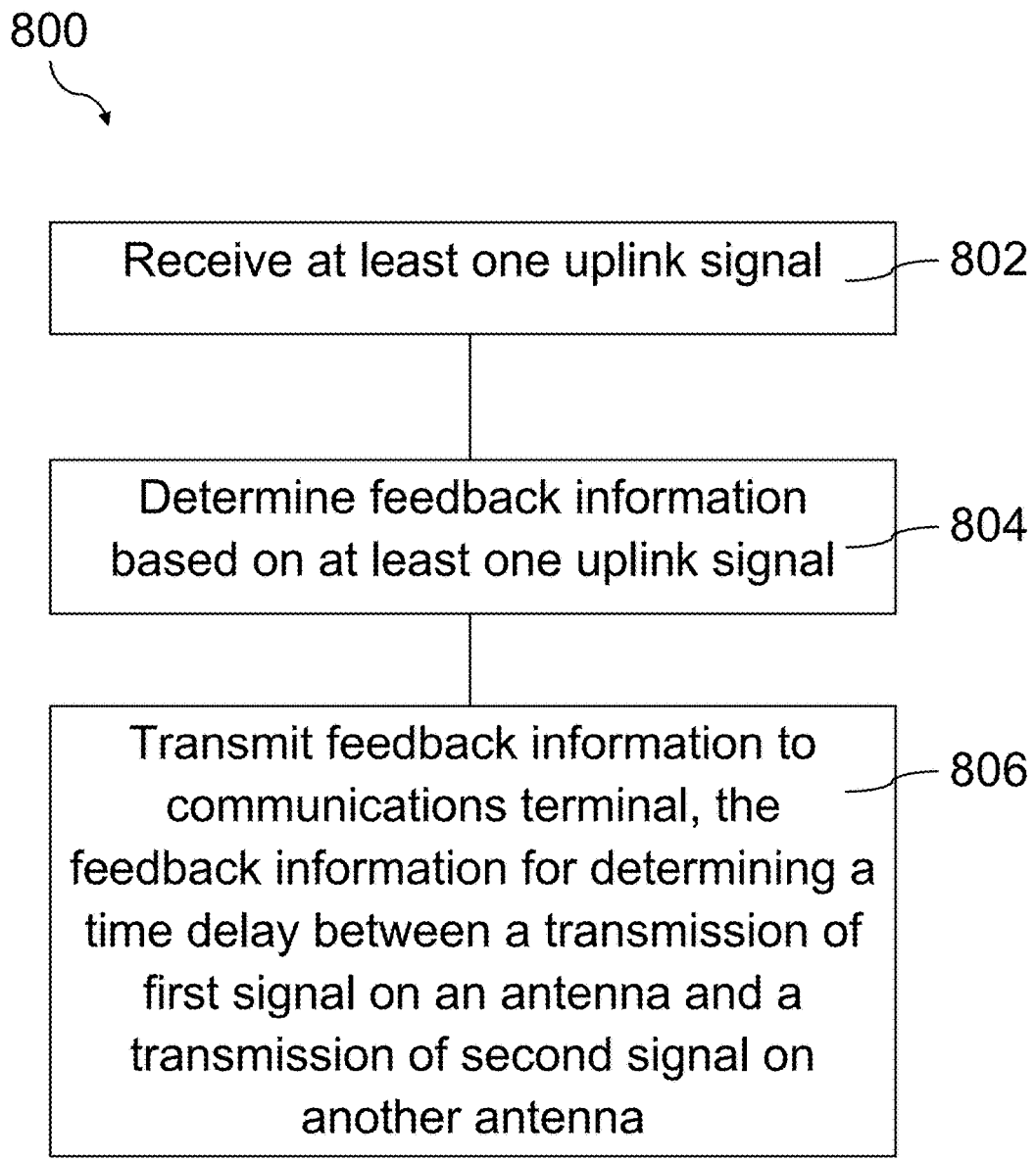
FIG. 8 shows a method for providing feedback information configured to be used by a communications terminal to determine a time delay.

FIG. 8 shows a method 800 for providing feedback information to a communications terminal.

The method 800 may include: receiving at least one uplink signal (in 802); determining the feedback information based on the at least one uplink signal (in 804); and transmitting the feedback information to the communications terminal, the feedback information for determining a time delay between a transmission of a first signal on an antenna and a transmission of a second signal on another antenna (in 806). The first signal and the second signal may have an at least substantially similar signal form.

The method 800 may, for example, be used by the network component 300 shown in FIG. 6 to determine and provide the feedback information 512 to the communications terminal 200.

According to various examples described herein, a communications terminal may be provided. The communications terminal may include: a plurality of antennas; and a transmitter configured to transmit a signal on an antenna of the plurality of antennas, where the transmitter further may be configured to transmit a delayed signal on another antenna of the plurality of antennas, where the delayed signal may be generated by delaying the signal by a time delay.

The delayed signal may have an at least substantially similar signal form as the signal.

The signal may be configured according to a 3G communications technology.

The communications terminal may further include a delay circuit configured to generate the delayed signal.

The delay circuit may be further configured to provide the delayed signal to the transmitter.

The communications terminal may further include a determining circuit configured to determine the time delay.

The determining circuit may be further configured to provide the time delay to a delay circuit configured to generate the delayed signal.

The communications terminal may further include a signal source configured to provide the signal to the transmitter.

The signal source may be further configured to provide the signal to a delay circuit configured to generate the delayed signal.

The signal source may be configured to provide the signal to the delay circuit upon receiving a delay instruction, wherein the delay instruction may indicate that the signal is to be delayed.

The communications terminal may further include a controller configured to generate a delay instruction in case the time delay is determined to be greater than or equal to zero, wherein the delay instruction may indicate that the signal is to be delayed.

The controller may be further configured to provide the delay instruction to a signal source configured to provide the signal to a delay circuit configured to generate the delayed signal.

The determining circuit may be configured to determine the time delay based on at least one downlink signal received at the plurality of antennas.

The determining circuit may be configured to determine the time delay based on a path delay profile determined from the at least one downlink signal.

The determining circuit may be configured to determine the time delay based on a delay spread of the path delay profile determined from the at least one downlink signal.

The determining circuit may be configured to determine the time delay based on a velocity determined from the at least one downlink signal.

The determining circuit may be configured to determine the time delay based on a frequency offset determined from the at least one downlink signal.

The determining circuit may be configured to determine the time delay based on a signal power determined from the at least one downlink signal.

The determining circuit may be configured to determine the time delay based on a signal-to-noise ratio determined from the at least one downlink signal.

The determining circuit may be configured to determine the time delay based on feedback information received at the plurality of antennas, wherein the feedback information may be received on the plurality of antennas from a network component of a radio communications network.

The feedback information may include, or may be, the time delay, wherein the time delay may be determined by the network component based on at least one uplink signal received at the network component.

The feedback information may include, or may be, an indication to the transmitter that the transmission of the delayed signal is to be withheld.

The feedback information may include, or may be, at least one channel parameter determined by the network component based on at least one uplink signal received at the network component.

The at least one channel parameter may be determined based on a path delay profile determined from the at least one uplink signal.

The at least one channel parameter may include, or may be, a delay spread of the path delay profile.

The at least one channel parameter may include, or may be, a velocity determined from the at least one uplink signal.

The at least one channel parameter may include, or may be, a frequency offset determined from the at least one uplink signal.

The at least one channel parameter may include, or may be, a signal power determined from the at least one uplink signal.

The at least one channel parameter may include, or may be, a signal-to-noise ratio determined from the at least one uplink signal.

According to various examples described herein, a network component may be provided. The network component may include: at least one antenna; a receiver configured to receive at least one uplink signal on the at least one antenna; and a determining circuit configured to determine feedback information based on the at least one uplink signal, the feedback information for determining a time delay between a transmission of a first signal on an antenna and a transmission of a second signal on another antenna.

The first signal and the second signal may have an at least substantially similar signal form.

The at least one uplink signal may be configured according to a 3G communications technology.

The network component may further include a transmitter configured to transmit the feedback information to the communications terminal on the at least one antenna.

According to various examples described herein, a method for transmitting a signal may be provided. The method may include: generating a delayed signal by delaying the signal by a time delay; transmitting the signal on an antenna of a plurality of antennas; and transmitting the delayed signal on another antenna of the plurality of antennas, wherein the signal may be configured according to a 3G communications technology.

The delayed signal may have an at least substantially similar signal form as the signal.

Transmitting the signal on the antenna of the plurality of antennas may include, or may consist of, transmitting a first uplink signal, and transmitting the delayed signal on the other antenna of the plurality of antennas may include, or may consist of, transmitting a second uplink signal.

According to various examples described herein, a method for providing feedback information to a communications terminal may be provided. The method may include: receiving at least one uplink signal; determining the feedback information based on the at least one uplink signal; and transmitting the feedback information to the communications terminal, the feedback information for determining a time delay between a transmission of a first signal on an antenna and a transmission of a second signal on another antenna.

The first signal and the second signal may have an at least substantially similar signal form.

The at least one uplink signal may be configured according to a 3G communications technology.

Transmitting the feedback information to the communications terminal may include, or may consist of, transmitting the feedback information on a feedback channel.

Various examples and aspects described in the context of one of the devices or methods described herein may be analogously valid for the other devices or methods described herein.

While various aspects have been particularly shown and described with reference to these aspects of this disclosure, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A user equipment device, comprising:
    a plurality of antennas;
    a transmitter configured to transmit an uplink signal on an antenna of the plurality of antennas and to transmit a delayed signal on another antenna of the plurality of antennas, wherein the delayed signal is generated by delaying the uplink signal by an adaptive time delay;
    a receiver configured to receive feedback information from a base station;
    wherein the feedback information is received on the plurality of antennas; and
    a determining circuit configured to determine the adaptive time delay based on at least a delay spread of the power delay profile of at least one downlink signal received at the plurality of antennas; wherein the adaptive time delay is larger than the delay spread of the power delay profile of the at least one downlink signal and/or fits within one or more gaps of the power delay profile of the at least one downlink signal.

2. The user equipment device of claim 1, wherein the delayed signal has an at least substantially similar signal form as the uplink signal is identical to or is an amplitude-scaled replica of the uplink signal.

3. The user equipment device of claim 2, wherein the transmitter is configured to transmit the uplink signal at a first transmission time and to transmit the delayed signal at a second transmission time according to the adaptive time delay, where the second transmission time occurs after the first transmission time.

4. The user equipment device of claim 1, further comprising:
a delay circuit configured to generate the delayed signal.

5. The user equipment device of claim 4, wherein the delay circuit is further configured to provide the delayed signal to the transmitter.

6. The user equipment device of claim 1, wherein the determining circuit is further configured to provide the adaptive time delay to a delay circuit configured to generate the delayed signal.

7. The user equipment device of claim 1, further comprising:
a signal source configured to provide the uplink signal to the transmitter.

8. The user equipment device of claim 7, wherein the signal source is further configured to provide the uplink signal to a delay circuit configured to generate the delayed signal.

9. The user equipment device of claim 8, wherein the signal source is configured to provide the uplink signal to the delay circuit upon receiving a delay instruction, wherein the delay instruction indicates that the uplink signal is to be delayed.

10. The user equipment device of claim 1,
a controller configured to generate a delay instruction in case the adaptive time delay is determined to be greater than or equal to zero, wherein the delay instruction indicates that the uplink signal is to be delayed.

11. The user equipment device of claim 10, wherein the controller is further configured to provide the delay instruction to a signal source configured to provide the uplink signal to a delay circuit configured to generate the delayed signal.

12. The user equipment device of claim 1, wherein the determining circuit is configured to determine the adaptive time delay based on a path delay profile determined from the at least one downlink signal.

13. The user equipment device of claim 12, wherein the determining circuit is configured to determine the adaptive time delay based on a delay spread of the path delay profile determined from the at least one downlink signal.

14. The user equipment device of claim 1, wherein the at least a delay spread of the power delay profile comprises a velocity of the at least one downlink signal.

15. The user equipment device of claim 1, wherein the at least a delay spread of the power delay profile comprises a frequency offset of the at least one downlink signal.

16. The user equipment device of claim 1, wherein the at least a delay spread of the power delay profile comprises a signal power of the at least one downlink signal.

17. The user equipment device of claim 1, wherein the at least a delay spread of the power delay profile comprises a signal-to-noise ratio of the at least one downlink signal.

18. The user equipment device of claim 1, wherein the feedback information comprises the adaptive time delay, wherein the adaptive time delay is determined by the base station based on at least one further uplink signal received at the base station.

19. The user equipment device of claim 1, wherein the feedback information comprises an indication to the transmitter that the transmission of the delayed signal is to be withheld.

20. The user equipment device of claim 1, wherein the feedback information comprises at least one channel parameter determined by the base station based on at least one further uplink signal received at the base station.

21. The user equipment device of claim 20, wherein the at least one channel parameter is determined based on a path delay profile determined from the at least one further uplink signal.

22. The user equipment device of claim 21, wherein the at least one channel parameter comprises a delay spread of the path delay profile.

23. The user equipment device of claim 20, wherein the at least one channel parameter comprises a velocity determined from the at least one further uplink signal.

24. The user equipment device of claim 20, wherein the at least one channel parameter comprises a frequency offset determined from the at least one further uplink signal.

25. The user equipment device of claim 20, wherein the at least one channel parameter comprises a signal power determined from the at least one further uplink signal.

26. The user equipment device of claim 20, wherein the at least one channel parameter comprises a signal-to-noise ratio determined from the at least one further uplink signal.

27. A base station, comprising:
at least one antenna;
a receiver configured to receive at least one first signal on the at least one antenna from a user equipment device; and
a determining circuit configured to determine an adaptive time delay between a transmission of the first signal on an antenna and a transmission of a second signal on another antenna, wherein the adaptive time delay is larger than a delay spread of a power delay profile from at least one downlink signal and/or fits within one or more gaps of a power delay profile from at least one downlink signal.

28. The base station of claim 27, further comprising:
a transmitter configured to transmit feedback information to a communications terminal on the at least one antenna.

29. A method for transmitting an uplink signal from a user equipment device, the method comprising:
receiving feedback information from a base station; wherein the feedback information is received on a plurality of antennas;
generating a delayed signal by delaying the uplink signal by an adaptive time delay;
transmitting the uplink signal on an antenna of the plurality of antennas;
transmitting the delayed signal on another antenna of the plurality of antennas; and
determining a new delay as the adaptive time delay based on at least a delay spread of the power delay profile of at least one downlink signal received at the plurality of antennas;
wherein the adaptive time delay is larger than the delay spread of the power delay profile of the at least one downlink signal and/or fits within one or more gaps of the power delay profile of the at least one downlink signal.

30. The method of claim 29, wherein the delayed signal has an at least substantially similar signal form as the uplink signal is identical to or is an amplitude-scaled replica of the uplink signal.

31. The method of claim 29, wherein transmitting the uplink signal on the antenna of the plurality of antennas comprises transmitting a first uplink signal, and wherein transmitting the delayed signal on the other antenna of the plurality of antennas comprises transmitting a second uplink signal.

32. A method for providing feedback information to a user equipment device from a base station, the method comprising:
- receiving at least one first signal;
- determining the feedback information based on the at least one first signal;
- wherein the feedback information comprises a time delay between the first signal transmitted from an antenna of the user equipment device and a second signal transmitted from another antenna; wherein the adaptive time delay is larger than a delay spread of a power delay profile from at least one downlink signal and/or fits within one or more gaps of a power delay profile from at least one downlink signal; and
- transmitting the feedback information to the user equipment device.

33. The method of claim 32, wherein the first signal and the second signal have an at least substantially similar signal form.

34. The method of claim 32, wherein transmitting the feedback information to the communications terminal comprises transmitting the feedback information on a feedback channel.

* * * * *